US 9,266,130 B2

United States Patent
Kouketsu et al.

(10) Patent No.: US 9,266,130 B2
(45) Date of Patent: Feb. 23, 2016

(54) LIQUID CONTROL APPARATUS

(71) Applicant: CKD CORPORATION, Komaki-shi, Aichi (JP)

(72) Inventors: Masayuki Kouketsu, Komaki (JP); Hiroshi Itafuji, Komaki (JP)

(73) Assignee: CKD CORPORATION, Komaki-Shi, Aichi (JP)

( * ) Notice: Subject to any disclaimer, the term of this patent is extended or adjusted under 35 U.S.C. 154(b) by 380 days.

(21) Appl. No.: 13/752,232

(22) Filed: Jan. 28, 2013

(65) Prior Publication Data

US 2013/0193230 A1 Aug. 1, 2013

(30) Foreign Application Priority Data

Feb. 1, 2012 (JP) ................... 2012-019466

(51) Int. Cl.
*B05B 9/03* (2006.01)
*B01B 1/00* (2006.01)
*B01D 1/14* (2006.01)

(52) U.S. Cl.
CPC . *B05B 9/03* (2013.01); *B01B 1/005* (2013.01); *B01D 1/14* (2013.01)

(58) Field of Classification Search
CPC ............ B01D 1/22; B01D 1/221; B01D 1/14; B05B 9/03; B01B 1/005; B01F 3/022
See application file for complete search history.

(56) References Cited

U.S. PATENT DOCUMENTS

| | | | | |
|---|---|---|---|---|
| 5,356,451 A * | 10/1994 | Cain | ...................... | B01D 1/0011 118/726 |
| 5,681,614 A * | 10/1997 | Omori | .................. | C23C 16/4412 427/248.1 |
| 6,224,681 B1 * | 5/2001 | Sivaramakrishnan | .. | B01F 3/022 118/726 |
| 6,604,492 B2 * | 8/2003 | Porter | ...................... | B01F 3/022 122/32 |
| 8,361,231 B2 * | 1/2013 | Kouketsu | ................ | B01B 1/005 118/712 |
| 2002/0014207 A1 * | 2/2002 | Sivaramakrishnan | .. | B01F 3/022 118/715 |
| 2002/0124641 A1 * | 9/2002 | Porter | ...................... | B01F 3/022 73/202.5 |
| 2003/0070964 A1 * | 4/2003 | Docter | .................... | B01D 1/005 208/133 |
| 2003/0079786 A1 * | 5/2003 | Diana | ........................ | B05B 9/03 137/884 |

(Continued)

FOREIGN PATENT DOCUMENTS

| | | | | |
|---|---|---|---|---|
| CA | 2405213 A1 * | 4/2003 | ................ | B05B 9/03 |
| GB | 1439603 | 6/1976 | | |

(Continued)

OTHER PUBLICATIONS

U.S. Appl. No. 13/940,102, filed Jul. 11, 2013.

(Continued)

*Primary Examiner* — Duane Smith
*Assistant Examiner* — Stephen Hobson
(74) *Attorney, Agent, or Firm* — Beyer Law Group LLP

(57) ABSTRACT

A liquid control apparatus 30 controls a spread mode of a liquid. The liquid control apparatus 30 includes a main body 31 having an upper surface 31c to which the liquid is supplied, and a mesh 47 woven in a net-like shape and provided to be in contact with the upper surface 31c. An inhibiting groove 41 is provided in the upper surface 31c in a portion that is in contact with the mesh 47. An introducing port 33b for introducing a gas from the inside of the main body 31 into the inhibiting groove 41 is provided in the main body 31. The introducing port 33b is formed such that the gas is introduced into the inhibiting groove 41 substantially parallel to the upper surface 31c.

23 Claims, 16 Drawing Sheets

(56) References Cited

U.S. PATENT DOCUMENTS

| | | | |
|---|---|---|---|
| 2005/0006609 A1* | 1/2005 | Fukano | F16K 31/1225 251/63.5 |
| 2007/0101940 A1* | 5/2007 | Iizuka | C23C 16/4486 118/726 |
| 2010/0022097 A1* | 1/2010 | Yamoto | C23C 16/4481 438/758 |
| 2012/0180724 A1* | 7/2012 | Kouketsu | B01B 1/005 118/712 |
| 2013/0081712 A1* | 4/2013 | Kouketsu | F16K 49/002 137/334 |
| 2013/0081733 A1* | 4/2013 | Kouketsu | B01B 1/005 138/103 |
| 2013/0193230 A1* | 8/2013 | Kouketsu | B05B 9/03 239/136 |
| 2014/0015151 A1* | 1/2014 | Kouketsu | B01F 3/04 261/152 |
| 2014/0026816 A1* | 1/2014 | Myo | B05B 9/03 118/728 |

FOREIGN PATENT DOCUMENTS

| | | | |
|---|---|---|---|
| JP | 49-52175 | 5/1974 | |
| JP | 5-156448 | 6/1993 | |
| JP | 6-132209 | 5/1994 | |
| JP | 6-232035 | 8/1994 | |
| JP | 7-47201 | 2/1995 | |
| JP | 7-155584 | 6/1995 | |
| JP | 9-152287 | 6/1997 | |
| JP | 9-186107 | 7/1997 | |
| JP | 10-337464 | 12/1998 | |
| JP | 2001-20239 | 7/2001 | |
| JP | 2001-200239 | 7/2001 | |
| JP | 2001-295050 | 10/2001 | |
| JP | 2002-110659 | 4/2002 | |
| JP | 2002-228117 | 8/2002 | |
| JP | 2004-115920 | 4/2004 | |
| JP | 2005-57193 | 3/2005 | |
| JP | 2006-352001 | 12/2006 | |
| JP | 2008-263244 | 10/2008 | |
| JP | 2009-38047 | 2/2009 | |
| JP | 2009-194246 | 8/2009 | |
| JP | 4673449 | 1/2011 | |
| WO | WO 2004/092622 | 10/2004 | |
| WO | WO 2011040067 A1 * | 4/2011 | B01B 1/005 |
| WO | WO 2012098730 A1 * | 7/2012 | B01B 1/00 |
| WO | WO 2014018336 A1 * | 1/2014 | B05B 9/03 |

OTHER PUBLICATIONS

Notice of Allowance dated Mar. 16, 2015 for U.S. Appl. No. 13/940,102.

* cited by examiner

LIQUID CONTROL APPARATUS

CROSS-REFERENCE TO RELATED APPLICATIONS

The present application claims priority based on Japan Patent Application No. 2012-019466 filed on Feb. 1, 2012, and the entire contents of that application are incorporated by reference in this specification.

BACKGROUND OF THE INVENTION

1. Field of the Invention

The present invention relates to a liquid control apparatus for controlling a spread of a liquid contacting a surface.

2. Description of the Related Art

In a liquid control apparatus of such type, a mesh (net-shaped body) is disposed on the upper surface of a heat storage plate, thereby forming fine protrusions and depressions on the heat storage plate. According to the description of Japan Patent Publication No. 4673449, a liquid supplied between the upper surface of a heat storage plate and a mesh spreads due to interface tension, thereby making it possible to supply the liquid to a wide surface area of the mesh.

However, in the configuration described in Japan Patent Publication No. 4673449, although the liquid can be spread over the upper surface of the heat storage plate by using the interface tension created by the fine protrusions and depressions, there remains room for improvement in terms of preferentially spreading the liquid that is in contact with the surface in the desired direction.

SUMMARY OF THE INVENTION

With the foregoing in view, it is a main objective of the present invention to provide a liquid control apparatus that makes it possible to spread a liquid contacting a surface preferentially in a desired direction.

The following means are used to attain the abovementioned object.

The first means is a liquid control apparatus configured to control a spread of a liquid. The liquid control apparatus comprises a main body having a supply surface to which the liquid is supplied, and a net-shaped (mesh) body woven in a net-like shape and provided to be in contact with the supply surface. In the liquid control apparatus, a first groove is formed in the supply surface in a portion in contact with the net-shaped body; and an introducing port configured to introduce a gas from an inside of the main body into the first groove is formed in the main body.

With such a configuration, since the net-shaped body is woven in a net-like shape and provided so as to be in contact with the supply surface of the main body, a plurality of interfaces are formed between the supply surface and the net-shaped body. Therefore, the liquid supplied to the supply surface is spread along the supply surface by the interface tension at the plurality of interfaces.

In this case, since the first groove is formed in a portion of the supply surface that is in contact with the net-shaped body, no interface is formed between the supply surface and the net-shaped body in this portion of the first groove and the spread of the liquid is inhibited. Therefore, by adjusting the arrangement of the first groove, it is possible to control the spread direction of the liquid that has come into contact with the supply surface and the liquid can be preferentially spread in the desired direction. Furthermore, since the gas is introduced into the first groove from the inside of the main body through the introducing port, the gas flows through in a flow channel formed by the first groove and the net-shaped body. As a result, the liquid can be effectively prevented from spreading across the first groove by the gas that flows through inside the first groove and is jetted out from the openings of the net-shaped body.

In the second means, the introducing port is formed such that the gas is introduced into the first groove substantially parallel to the supply surface.

With such a configuration, since the gas is introduced in the first groove substantially parallel to the supply surface through the introducing port, the gas easily flows through inside the first groove in the direction parallel to the supply surface. Therefore, the gas inside the groove can be prevented from being jetted out directly from the openings of the net-shaped body, and the gas is easily caused to flow through along the first groove. As a result, the gas can be jetted out from the openings of the net-shaped body over a wide range of the first groove, and the liquid can be effectively prevented from spreading in a wide range of the first groove.

In the third means, a supply port configured to supply the liquid from the inside of the main body to the supply surface and a discharge port configured to discharge a fluid from a space on the periphery of the supply surface into the inside of the main body are formed in the main body, and the supply port is formed between the first groove and the discharge port.

With such a configuration, the liquid is supplied from the inside of the main body to the supply surface through the supply port, and the liquid spreads along the supply surface under the effect of the net-shaped body. The liquid spreading along the supply surface is actively evaporated and converted into vapors and also prevented from spreading in a portion where the first groove is formed. In this case, since the supply port is formed between the first groove and the discharge port, the liquid and vapors of the liquid are pushed in the direction from the first groove to the discharge port by the gas that flows through inside the first groove and is jetted out from the openings of the net-shaped body. As a result, the liquid and vapors of the liquid are easily discharged from the discharge port.

In the fourth means, a second groove connected to the discharge port is formed in the supply surface.

With such a configuration, since the second groove connected to the discharge port is formed in the supply surface, the liquid and vapors of the liquid that have flown into the second groove are easily guided into the discharge port. As a result, the liquid and vapors of the liquid can be smoothly discharged from the discharge port.

In the fifth means, the second groove extends in a direction substantially perpendicular to the direction from the supply port to the discharge port in the supply surface.

With such a configuration, since the second groove extends in the directions substantially perpendicular to the direction from the supply port to the discharge port in the supply surface, the liquid and vapors of the liquid spreading outside from the direction from the supply port to the discharge port are easily collected by the second groove.

In the sixth means, the second groove is provided with an extension section configured to extend in a direction from the discharge port to the supply port and then extend to an outer edge of the supply surface in a direction substantially perpendicular to the direction from the discharge port to the supply port.

When no member is in contact with the outer edge of the supply surface, the liquid spreads along the outer edge so as to remain inside the supply surface. Meanwhile, when a member is in contact with the outer edge, the liquid spreads along the boundary of the supply surface and the member (outer edge of the supply surface).

With the abovementioned configuration, the liquid spreading along the outer edge of the supply surface flows into the extension section that extends in the direction from the discharge port to the supply port and then extends to the outer edges of the supply surface in the direction substantially perpendicular to the direction from the discharge port to the supply port. Therefore, the liquid spreading along the outer edges of the supply surface can be effectively guided by the second groove to the discharge port.

In the seventh means, the main body is disposed so that the supply surface is on an upper side.

With such a configuration, since the main body is disposed such that the supply surface is on the upper side, the liquid that has flown into the first groove accumulates in the bottom section of the first groove. Therefore, the liquid that has flown into the first groove can be prevented from flowing in reverse to the net-shaped body side. As a result, the liquid can be effectively prevented from spreading across the first groove.

Further, when the seventh means is combined with the fourth means, the liquid that has flown into the second groove accumulates in the bottom portion of the second groove. The liquid that has accumulated inside the second groove is easily guided along the second groove to the discharge port. Therefore, the liquid that has flown into the second groove can be even more smoothly discharged from the discharge port.

In the eighth means, a discharge port configured to discharge a fluid from a space on the periphery of the supply surface into the inside of the main body is formed in the main body, and the liquid control apparatus further includes a discharge passage connected to the discharge port and serving to discharge the fluid and a branch passage branching off from a lower section of the discharge passage.

With such a configuration, the gas is discharged from the space on the periphery of the supply surface into the inside of the main body through the discharge port formed in the main body. The gas is also discharged from the inside of the main body through the discharge passage connected to the discharge port. In this case, since the main body is disposed so that the supply surface is on the upper side, the liquid that has flown into the discharge passage through the discharge port accumulates in the lower portion of the discharge passage. Since the branch passage branches off from the lower portion of the discharge passage, the liquid accumulated in the lower portion of the discharge passage can be discharged from the branch passage. As a result, the gas and liquid flowing through inside the discharge passage can be adequately separated.

In the ninth means, a supply port configured to supply the liquid from the inside of the main body to the supply surface is formed in the main body, a heater configured to heat the supply surface is provided inside the main body, and the supply port is formed between the first groove and the heater in a spread direction of the supply surface.

With such a configuration, the liquid is prevented from spreading from the supply port to a side opposite that of the heater by the first groove formed in the supply surface. Since the liquid is prevented from spreading to the side opposite that of the heater, the spread of the liquid to the heater side can be enhanced. As a result, heating of the liquid by the heater can be enhanced and the evaporation of the liquid can be further enhanced.

In the tenth means, a supply port configured to supply the liquid from the inside of the main body to the supply surface is formed in the main body, a temperature sensor configured to detect a temperature of the supply surface is provided inside the main body, and the supply port is formed between the first groove and the sensor in a spread direction of the supply surface.

When the liquid supplied to the supply surface is evaporated, the temperature of the supply surface is decreased by the vaporization heat of the liquid. Therefore, by detecting the temperature of the supply surface, it is possible to estimate the degree of vaporization of the liquid.

In this respect, with the abovementioned configuration, the liquid is prevented from spreading from the supply port to the side opposite that of the temperature sensor by the first groove formed in the supply surface. Further, since the liquid is prevented from spreading to the side opposite that of the temperature sensor, the spread of the liquid to the temperature sensor side can be enhanced. As a result, the decrease in temperature of the supply surface caused by vaporization of the liquid is sensitively reflected in the detection values of the temperature sensor and therefore the degree of vaporization of the liquid can be estimated more accurately.

In the eleventh means, a guide member is provided to be in contact with the net-shaped body on a side opposite the main body side.

With such a configuration, since the guide member is provided so as to be in contact with the net-shaped body on the side opposite the main body side, a plurality of interfaces are also formed between the net-shaped body and the guide member. Therefore, the liquid is also spread by the interface tension between the net-shaped body and the guide member. Thus, the spread of the liquid in the portion where the guide member is provided can be enhanced by comparison with that in other portions. As a result, by adjusting the arrangement of the guide member, it is possible to spread preferentially the liquid that is in contact with the supply surface in the desired direction.

In the twelfth means, the liquid control apparatus has an overlapping portion where the first groove and the guide member overlap each other, and the introducing port is disposed in the overlapping portion.

When the first groove and the guide member overlap each other, the liquid may spread across the first groove by flowing along the guide member.

In this respect, with the abovementioned configuration, since the gas is introduced in the groove from the introducing port arranged in the portion of the abovementioned overlapping, the amount of the gas blown onto the guide member can be increased. As a result, the liquid can be prevented from spreading across the first groove by propagating along the guide member.

The above and other objects, features, and advantages of the present invention will be apparent from the following description when taken in conjunction with the accompanying drawings which illustrate preferred embodiments of the present invention by way of example.

DESCRIPTION OF THE PREFERRED EMBODIMENTS

An embodiment of the present invention will be explained below with reference to the drawings. The present embodiment is specifically realized as a liquid vaporizer that vaporizes a chemical and discharges vapors, while mixing with inactive gas.

Figure 1A:
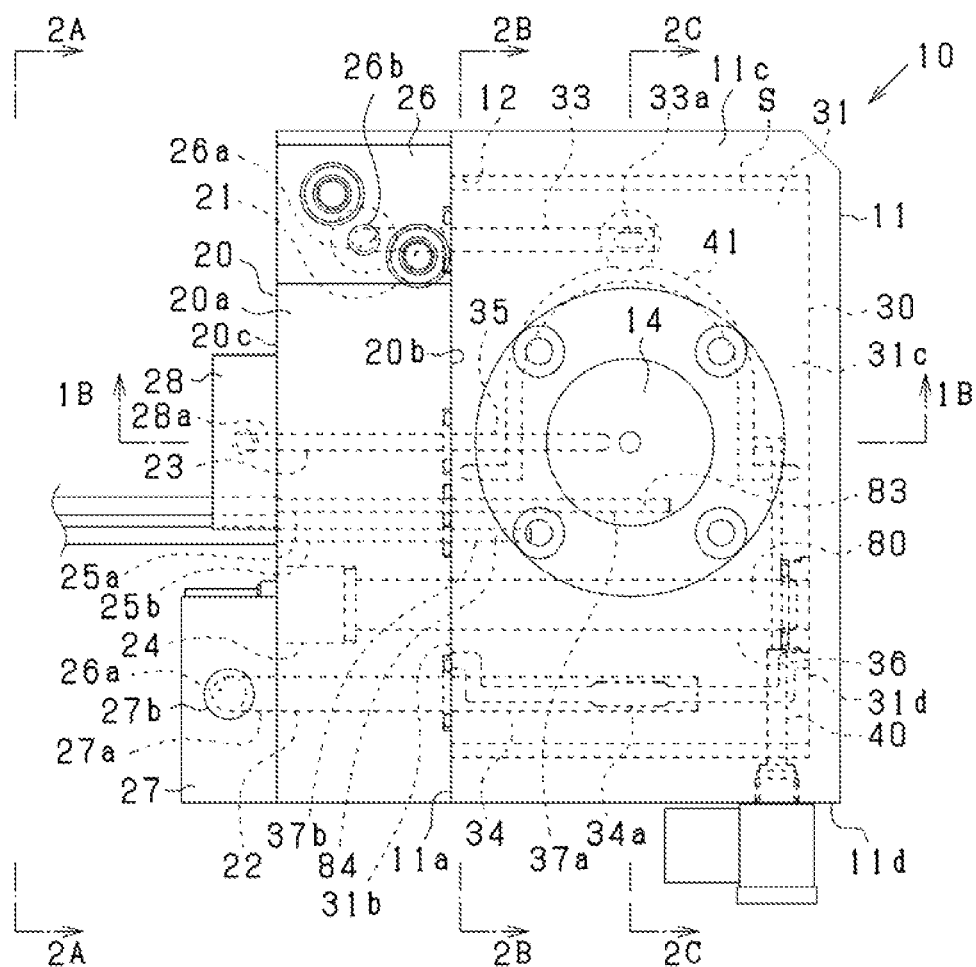
FIG. 1A is a plan view of a liquid vaporizer.
Figure 1B:
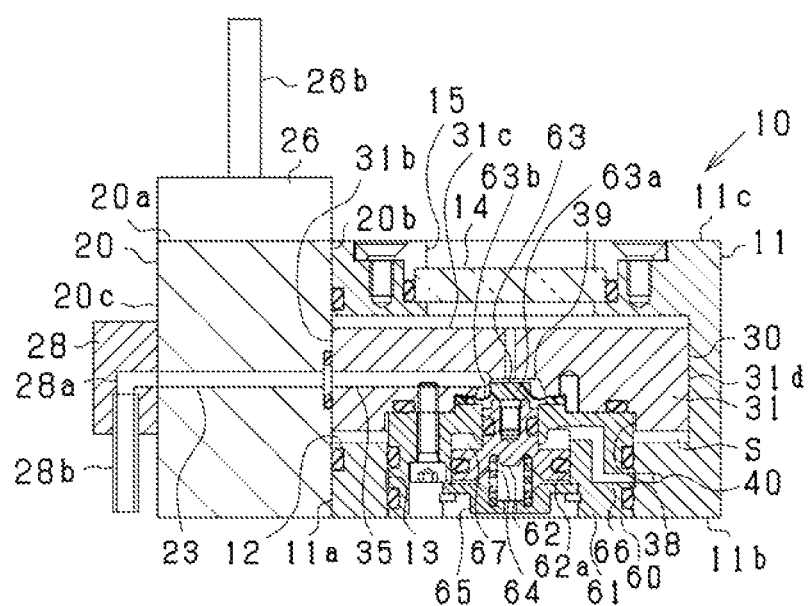
FIG. 1B is a cross-sectional view taken along the 1B-1B line in FIG. 1A.

FIG. 1A is a plan view illustrating a liquid vaporizer 10, and FIG. 1B is a cross-sectional view taken along the 1B-1B line of the configuration shown in FIG. 1A. As shown in the figures, the liquid vaporizer 10 is equipped with a first housing 11, a second housing 20, a liquid control apparatus 30, a valve unit 60, a heater 80, and thermocouples 83 and 84, and so on.

The first housing 11 is formed as a hollow rectangular parallelepiped, and a columnar space S with an elliptical bottom surface is formed in the first housing 11. The columnar space S is opened by an elliptical opening 12 at a side surface 11a of the first housing 11. An insertion hole 13 for inserting the valve unit 60 is formed in a lower surface 11b of the first housing 11. An attachment hole 15 for attaching a glass plate 14 is formed in an upper surface 11c of the first housing 11.

The liquid control apparatus 30 is inserted into the columnar space S through the opening 12. The valve unit 60 is inserted into the insertion hole 13. The space between the first housing 11 and the valve unit 60 is sealed by a sealing member. The glass plate 14 is attached by a fastening member to the attachment hole 15. The space between the first housing 11 and the glass plate 14 is sealed by a sealing member. An operator can observe the inside of the first housing 11 from above through the glass plate 14.

Figure 2A:
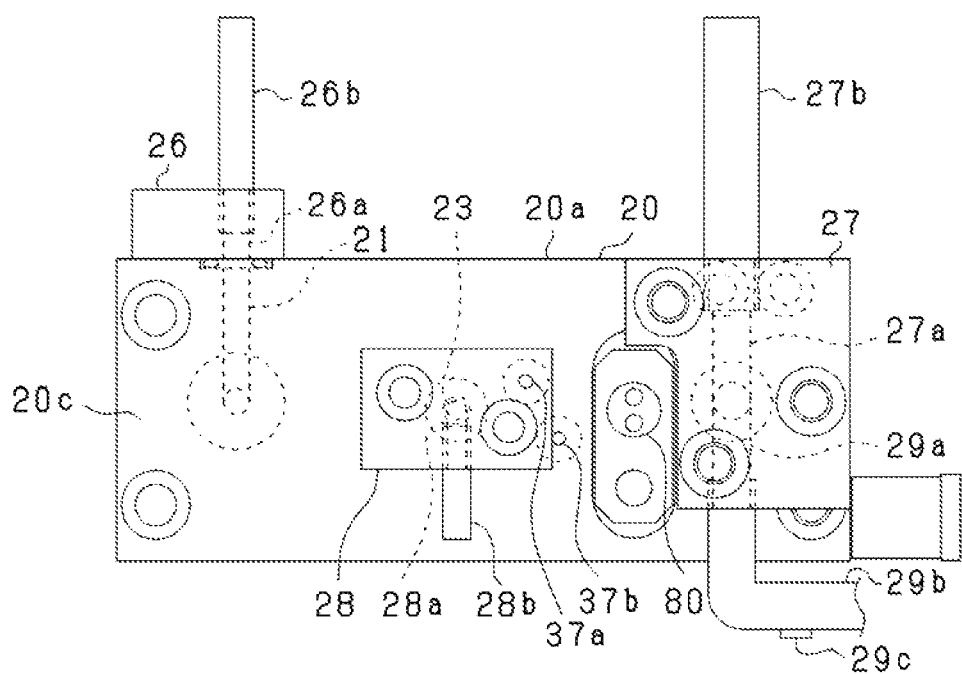
FIG. 2A is a side view illustrating the liquid vaporizer.

FIG. 2A is a side view of the second housing 20 taken along the 2A-2A line in FIG. 1A. Referring also to FIG. 2A, the second housing 20 is formed as a rectangular parallelepiped and attached to the side surface 11a of the first housing 11. The space between the first housing 11 and the second housing 20 is sealed with a sealing member. In the second housing 20, the surface facing the side surface 11a of the first housing 11 serves as a side surface 20b. A first gas flow channel 21, a second gas flow channel 22, a chemical flow channel 23, a heater insertion hole 24, and thermocouple insertion holes 25a and 25b are formed in the second housing 20.

The first gas flow channel 21 passes through the second housing 20 from the side surface 20b to an upper surface 20a. The second gas flow channel 22 (discharge passage) passes through from the side surface 20b to a side surface 20c on the side opposite that of the side surface 20b. The first gas flow channel 21 and the second gas flow channel 22 are formed at positions close to respective ends of the upper surface 20a in the longitudinal direction. The chemical flow channel 23 passes through from the side surface 20b to the side surface 20c substantially in the center of the side surface 20b and the side surface 20c. The heater insertion hole 24 passes through from the side surface 20b to the side surface 20c between the second gas flow channel 22 and the chemical flow channel 23. The thermocouple insertion holes 25a and 25b pass through from the side surface 20b to the side surface 20c between the chemical flow channel 23 and the heater insertion hole 24.

A first block 26, a second block 27, and a chemical block 28 are attached by fastening members or the like to the second housing 20.

The first block 26 is attached to the upper surface 20a of the second housing 20. A first block flow channel 26a passing through the lower surface of the first block 26 to the upper surface of the block 26 is formed in the first block 26. One end of the first block flow channel 26a is connected to the first gas flow channel 21. The other end of the first block flow channel 26a is connected to a first gas pipe 26b. Gas is introduced from the first gas pipe 26b into the first block 26.

The second block 27 is attached to the side surface 20c of the second housing 20. A second block flow channel 27a (discharge passage) passes through the side surface of the second block 27 to the upper surface of the block 27. One end of the second block flow channel 27a is connected to the second gas flow channel 22. The other end of the second block flow channel 27a is connected to a second gas pipe 27b. The gas is discharged from the second block 27 into the second gas pipe 27b. As shown in FIG. 2A, a liquid flow channel 29a (branch passage) is branched off from the lower section of the second block flow channel 27a. A liquid pipe 29b is connected to the end section of the liquid flow channel 29a. The liquid is discharged from the second block 27 into the liquid pipe 29b. The liquid pipe 29b is bent from the vertical direction to the horizontal direction. A liquid sensor 29c that detects the liquid is attached to the lower section of the liquid pipe 29b. The liquid sensor 29c detects the liquid flowing inside the liquid pipe 29b.

The chemical block 28 is attached to the side surface 20c of the second housing 20. A chemical block flow channel 28a passing through the side surface of the chemical block 28 to the lower surface of the block 28 is formed in the chemical block 28. One end of the chemical block flow channel 28a is connected to the chemical flow channel 23. A chemical pipe 28b is connected to the other end of the chemical flow channel 28a. The chemical is introduced from the chemical pipe 28b into the chemical block 28.

Figure 2B:
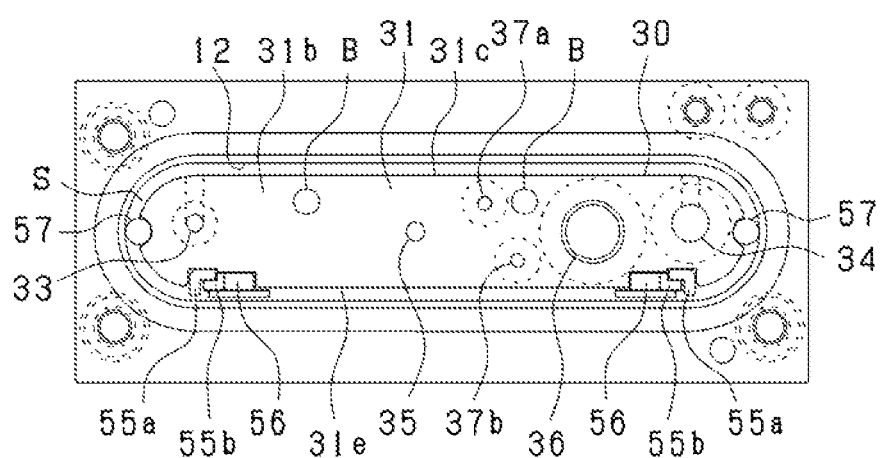
FIG. 2B is a side view taken along the 2B-2B line in FIG. 1A.
Figure 2C:
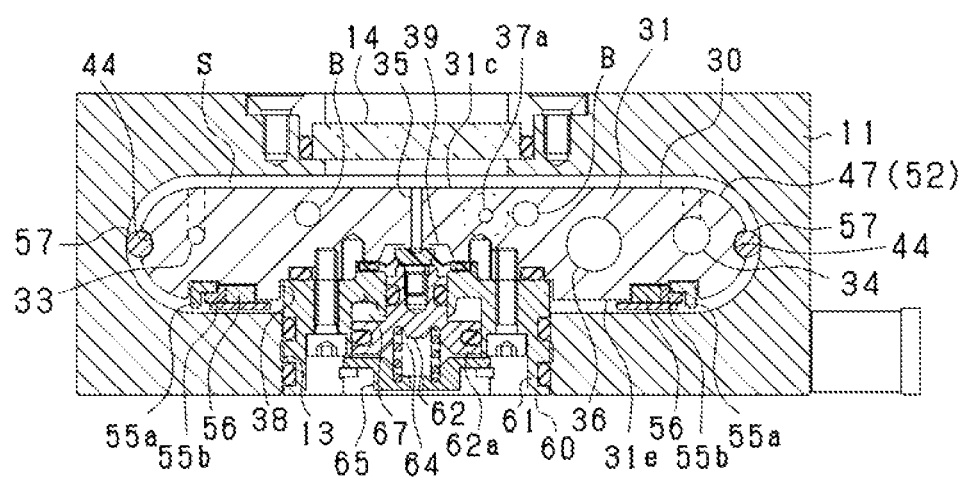
FIG. 2C is a cross-sectional view taken along the 2C-2C line in FIG. 1A.

FIG. 2B is a cross-sectional view taken along the 2B-2B line in FIG. 1A, and FIG. 2C is a cross-sectional view taken along the 2C-2C line in FIG. 1A. Referring also to FIG. 2B and FIG. 2C, the liquid control apparatus 30 has a main body 31.

The main body 31 is formed in a columnar shape with an elliptical bottom surface correspondingly to the columnar space S and is smaller in size than the columnar space S. As described above, the liquid control apparatus 30 is inserted from the opening 12 into the columnar space S of the first housing 11. The liquid control apparatus 30 is also attached to the side surface 20b of the second housing 20 by using a fastening member in a through hole B formed in the main body 31. As a result, an elliptical tubular gap is formed between the inner circumferential surface of the first housing 11 and the main body 31. In the main body 31, the surface facing the side surface 20b of the second housing 20 serves as a side surface 31b.

A first main body flow channel 33, a second main body flow channel 34, a chemical flow channel 35, a heater insertion hole 36, thermocouple insertion holes 37a and 37b, and a recess 38 (see FIG. 1B) are formed in the main body 31.

The first main body flow channel 33 passes through the main body 31 from the side surface to the upper surface of the main body 31. One end of the first main body flow channel 33 is connected to the first gas flow channel 21. The other end of the first main body flow channel 33 is open substantially in the center of the main body 31 in the direction from the second housing 20 to the first housing 11 (lateral direction of an upper surface 31c of the main body 31).

The second main body flow channel 34 (discharge passage) passes through the main body 31 from the side surface to the upper surface of the main body 31. One end of the second main body flow channel 34 is connected to the second gas flow channel 22. The other end of the second main body flow channel 34 is open substantially in the center of the main body 31 in the lateral direction of the upper surface 31c of the main body 31. The first main body flow channel 33 and the second main body flow channel 34 are respectively provided at positions close to respective ends of the upper surface 31c in the longitudinal direction.

The chemical flow channel 35 passes through the main body 31 from the side surface 31b to the upper surface 31c thereof. One end of the chemical flow channel 35 is connected to the chemical flow channel 23. The other end of the chemical flow channel 35 is open substantially in the center of the main body 31 in the lateral direction of the upper surface 31c of the main body 31.

The heater insertion hole 36 is connected to the heater insertion 24 and extends from the side surface 31b to the vicinity of a side surface 31d on the opposite side. The heater 80 is inserted into the heater insertion holes 24 and 36, and the upper surface 31c is heated by the heater 80.

The thermocouple insertion hole 37a is connected to the thermocouple insertion hole 25a and extends substantially to the center of the main body 31 in the lateral direction of the upper surface 31c of the main body 31. The thermocouple insertion hole 37a is formed in the vicinity of the upper surface 31c in the main body 31. The first thermocouple 83 (temperature sensor) is inserted into the thermocouple insertion holes 25a and 37a, and the temperature in the vicinity of the upper surface 31c is detected by the first thermocouple 83.

The thermocouple insertion hole 37b is connected to the thermocouple insertion hole 25b and extends to a position before the center of the main body 31 (approximately a ¼ position) in the lateral direction of the upper surface 31c of the main body 31. The thermocouple insertion hole 37b is formed at a position close to a lower surface 31e in the main body 31. The second thermocouple 84 (temperature sensor) is inserted into the thermocouple insertion holes 25b and 37b, and the temperature at a position close to the lower surface 31e is detected by the second thermocouple 84.

As shown in FIG. 1B, the recess 38 is formed in the main body 31 at a position facing the insertion hole 13 of the first housing 11. The valve unit 60 is inserted into the insertion hole 13 and the recess 38, and the valve unit 60 is attached to the main body 31 with a fastening member or the like. The space between the main body 31 and the valve unit 60 is sealed with a sealing member. The recess 38 communicates with the chemical flow channel 35. A valve seat 39 is provided in a communication portion of the chemical flow channel 35 and the recess 38. A working gas flow channel 40 is formed in the main body 31. The working gas flow channel 40 extends from the side surface 11d of the first housing 11 substantially to the center of the first housing 11 in the longitudinal direction of the upper surface 11c of the first housing 11. The working gas flow channel 40 is bent in the lateral direction of the upper surface 11c and communicates with the insertion hole 13. Introduction and discharge of the working gas into and from the working gas flow channel 40 are controlled by a control unit of the liquid control apparatus 30.

The valve device 60 is provided with a main body 61, a piston 62, a diaphragm valve element 63, a spring 64, and a spring retainer 65 and so on.

The main body 61 is formed in a tubular shape, and a piston 62 is housed inside of the main body 61. Central axial lines of the main body 61 and the piston 62 match each other.

The piston 62 is supported by the main body 61 to be slidable in the central axial line direction. The spaces between the main body 61 and the first housing 11, between the main body 61 and the main body 31 of the liquid control apparatus 30, and between the main body 61 and the piston 62 are sealed with respective sealing members.

A valve main body 63a of the diaphragm valve element 63 is attached to the distal end of the piston 62. The outer edge section of a diaphragm 63b of the diaphragm valve element 63 is sandwiched by the main body 31 of the liquid control apparatus 30 and the main body 61.

One end of the spring 64 impinges on the piston 62, and the other end of the spring is supported by the spring retainer 65. The piston 62 is biased by the spring 64 toward the valve seat 39. As a result, in the natural state, the valve main body 63a of the diaphragm valve element 63 is pressed against the valve seat 39 and the chemical flow channel 35 is blocked.

A working gas flow channel 66 is formed in the main body 61. One end of the working gas flow channel 66 is connected to the working gas flow channel 40 of the first housing 11. The other end of the working gas flow channel 66 communicates with a pressure chamber 67 on a side opposite to the spring 64 in the main body 61 across a flange section 62a. Where the working gas is introduced through the working gas flow channels 40 and 66, the piston 62 is moved in the direction away from the valve seat 39. As a result, the chemical flow channel 35 is open and the chemical is supplied to the upper surface 31c of the main body 31 of the liquid control apparatus 30.

Figure 3:
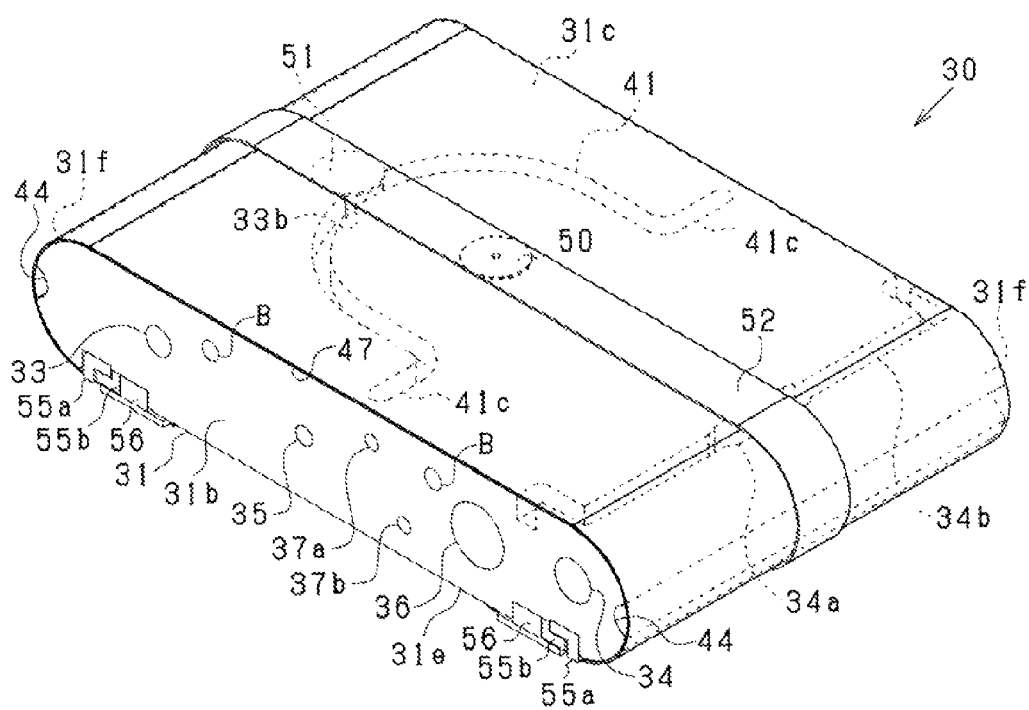
FIG. 3 is a perspective view illustrating the liquid control apparatus.
Figure 4:
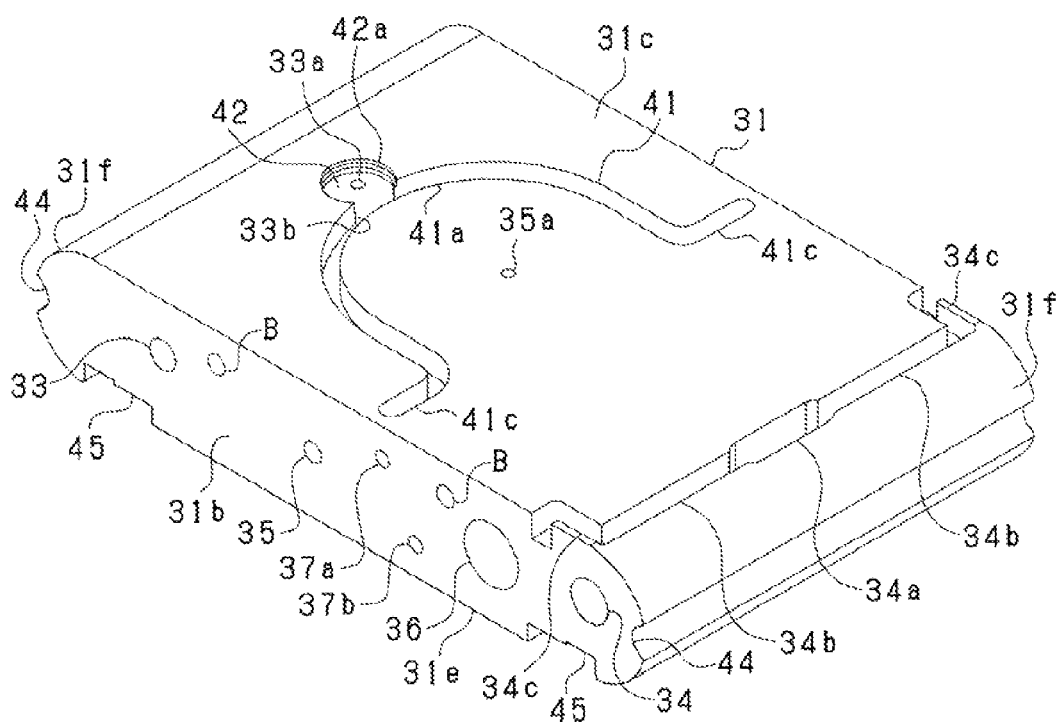
FIG. 4 is a perspective view illustrating the main body of the liquid control apparatus.

The configuration of the liquid control apparatus 30 will be explained below in greater detail. FIG. 3 is a perspective view showing the liquid control apparatus 30. FIG. 4 is a perspective view showing the main body 31 of the liquid control apparatus 30. As shown in the figures, the liquid control apparatus 30 is provided with the main body 31, a mesh 47, a first blocking member 50, a second blocking member 51, a mesh band 52, mesh retainers 55a and 55b, and a fixing member 56. The main body 31 is formed of a material with comparatively high corrosion resistance against chemicals and a comparatively high wetting ability with respect to chemicals. For example, when the chemical is a hydrophobizing treatment liquid, the main body is formed of a stainless steel material or an aluminum material.

The first main body flow channel 33 is open and a gas introducing port 33a is formed at the upper surface 31c of the main body 31. The second main body flow channel 34 is open and liquid discharge port 34a is formed at the upper surface 31c of the main body 31. The chemical flow channel 35 is open and a chemical supply port 35a is formed at the upper surface 31c (supply surface) of the main body 31.

The introducing port 33a and the discharge port 34a are formed such that the supply port 35a, thermocouple insertion holes 37a and 37b (thermocouples 83 and 84), and heater insertion hole 36 (heater 80) are interposed between the ports 33a and 34a. Thus, the supply port 35a, thermocouple insertion holes 37a and 37b, and heater insertion hole 36 are formed between the introducing port 33a and the discharge port 34a in the spread direction of the upper surface 31c. The supply port 35a is formed between the introducing port 33a and the discharge port 34a, more specifically, slightly closer to the introducing port 33a between the introducing port 33a and the discharge port 34a.

The supply port 35a is formed between the introducing port 33a and the heater insertion hole 36 in the spread direction of the upper surface 31c. Further, the supply port 35a is formed between the introducing port 33a and the thermocouple insertion holes 37a and 37b in the spread direction of the upper surface 31c. Thus, the supply port 35a is formed on the introducing port 33a side with respect to the thermocouple insertion holes 37a and 37b and the heater insertion hole 36.

The thermocouple insertion holes 37a and 37b and the heater insertion hole 36 are formed between the supply port 35a and the discharge port 34a in the spread direction of the upper surface 31c. Thus, the thermocouple insertion holes 37a and 37b and the heater insertion hole 36 are formed on the discharge port 34a side with respect to the supply port 35a.

The thermocouple insertion holes 37a and 37b are formed on the supply port 35a side with respect to the heater insertion hole 36 in the spread direction of the upper surface 31c. The thermocouple insertion hole 37a is provided on the supply port 35a side with respect to the thermocouple insertion hole 37b in the spread direction of the upper surface 31c.

The discharge port 34a is formed to be larger than the introducing port 33a. More specifically, the discharge port 34a extends further than the introducing port 33a in the direction (lateral direction of the upper surface 31c) perpendicular to the direction from the introducing port 33a to the discharge port 34a.

A gas collecting groove 34b communicating with (connected to) the discharge port 34a is formed in the upper surface 31c of the main body 31. The gas collecting groove 34b (second groove) extends from both ends of the discharge port 34a in the lateral direction of the upper surface 31c. The gas collecting groove 34b is formed over the entire length in the lateral direction of the upper surface 31c. Thus, the gas collecting groove 34b extends in a direction substantially perpendicular to the direction from the supply port 35a (introducing port 33a) to the discharge port 34a on the upper surface 31c. The gas collecting groove 34b is provided with respective extension sections 34c that extend in the direction from the discharge port 34a to the introducing port 33a (longitudinal direction of the upper surface 31c) and then extend to the outer edges of the upper surface 31c in the direction substantially perpendicular to the direction from the supply port 35a to the discharge port 34a. The gas collecting groove 34b is formed to be slightly narrower than the discharge port 34a in the direction from the introducing port 33a to the discharge port 34a. The depth of the gas collecting groove 34b is set such that the gas flowing in the direction from the introducing port 33a to the discharge port 34a can be collected along the gas collecting groove 34b into the discharge port 34a. For example, the depth of the gas collecting groove 34b is set to 0.5 mm to 1.5 mm, preferably 1.0 mm. The width of the gas collecting groove 34b is set, for example, to 1.0 mm to 2.0 mm, preferably 1.5 mm.

An inhibiting groove 41 (first groove) for inhibiting the spread of the chemical from the supply port 35a to the side opposite that of the heater insertion hole 36 (heater 80) and the side opposite that of the thermocouple insertion holes 37a and 37b (thermocouples 83 and 84) is formed in the upper surface 31c of the main body 31. The inhibiting groove 41 includes a circular-arc section 41a and linear sections 41c.

The circular-arc section 41a is formed as a half-circle circular arc around the periphery of the supply port 35a, except for the heater insertion hole 36 side and the thermocouple insertion holes 37a and 37b side. Thus, the circular-arc section 41a surrounds half of the supply port 35a on the introducing port 33a side (half a circle on the side opposite that of the discharge port 34a).

The mutual arrangement of the inhibiting groove 41 with the discharge port 34a, supply port 35a, thermocouple insertion holes 37a and 37b (thermocouples 83 and 84), and heater insertion port 36 (heater 80) is the same as that of the introducing port 33a. Thus, the supply port 35a, thermocouple insertion holes 37a and 37b, and heater insertion port 36 are formed between the inhibiting groove 41 and the discharge port 34a in the spread direction of the upper surface 31c. The supply port 35a is formed between the inhibiting groove 41 and the thermocouple insertion holes 37a and 37b in the spread direction of the upper surface 31c. The supply port 35a is also formed between the inhibiting groove 41 and the heater insertion port 36 in the spread direction of the upper surface 31c.

The linear sections 41c extend from the end portions of the circular-arc section 41a to the outer sides of the upper surface 31c in the lateral direction of the upper surface 31c. The length of the linear sections 41c is less than the radius of the circular-arc section 41a. The linear sections 41c extend to the ends in the lateral direction of the upper surface 31c. The width and depth of the inhibiting groove 41 are set similarly to the width and depth of the gas collecting groove 34b.

A recess 42 is formed in the upper surface 31c on the side of the central portion of the circular-arc section 41a (inhibiting groove 41), more specifically on the side opposite that of the supply port 35a. The recess 42 is formed in a substantially round shape and communicates with the circular-arc section 41a of the inhibiting groove 41. A step 42a is provided at the inner edge of the recess 42. The main body 31 (liquid control apparatus 30) is disposed such that the supply surface where the supply port 35a is formed becomes the upper surface 31c. In this state, the upper surface of the step 42a is higher than the bottom surface of the recess 42. The introducing port 33a is formed substantially in the center of the recess 42, that is, at a position offset from the inhibiting groove 41. The introducing port 33a, supply port 35a, and discharge port 34a are arranged on the same straight line.

Mesh retainers 55a and 55b and an engagement groove 45 for engaging the fixing member 56 are formed in the lower surface 31e of the main body 31 at both ends of the main body 31 in the longitudinal direction. The engagement groove 45 is formed to have predetermined width and depth and extend along the lateral direction of the lower surface 31e.

As shown in FIG. 3, the mesh retainers 55a and 55b are formed as rods with an L-like cross section. The fixing member 56 is formed as a rod with a T-like cross section. Lengths of the mesh retainers 55a and 55b and the fixing member 56 are equal to a length of the lower surface 31e in the lateral direction.

The width and depth of the engagement groove 45 are set such that when the first mesh retainer 55a, second mesh retainer 55b, and fixing member 56 are assembled in this order, they can be fixed. The fixing member 56 may be also configured as a fastening member for fastening the second mesh retainer 55b to the main body 31.

A recess 44 is formed in each of curved surfaces 31*f* of the main body 31 to extend linearly in the lateral direction of the upper surface 31*c*.

On the outer periphery of the main body 31, a mesh 47 (net-shaped body) woven in a net-like shape is provided so as to be in contact with the upper surface 31*c* and the curved surfaces 31*f*. Therefore, the recess 42, introducing port 33*a*, inhibiting groove 41, discharge port 34*a*, and gas collecting groove 34*b* are formed in portions of the upper surface 31*c* that are in contact with the mesh 47.

The mesh 47 is formed in a rectangular shape to a size such that the upper surface 31*c* and the curved surfaces 31*f* can be covered by the mesh 47. More specifically, the length of the upper surface 31*c* in the lateral direction matches the length of the mesh 47 in the lateral direction, and the length of the mesh 47 in the longitudinal direction is larger than a sum total of the length of the upper surface 31*c* in the longitudinal direction and the lengths of the outer circumference of the curved surfaces 31*f*.

The mesh 47 is wound on the upper surface 31*c* and the two curved surfaces 31*f*. Therefore, the introducing port 33*a*, supply port 35*a*, inhibiting groove 41, gas collecting groove 34*b*, and discharge port 34*a* are covered by the mesh 47.

The mesh size of the mesh 47 is set such that the chemical can easily create membranes in the openings of the mesh 47, for example, 100 mesh having 100 openings per 1 inch. More specifically, the mesh 47 has a wire diameter of 0.1 mm and a distance between the wires of 0.15 mm. The mesh size of the mesh 47 is desirably set adequately according to the wetting ability of the chemical with respect to the mesh 47, wetting ability of the chemical with respect to the main body 31, viscosity of the chemical, and the like. In this case, the width of the inhibiting groove 41 and the gas collecting groove 34*b* is six or more times the distance between the wires in the mesh 47, and the depth of the inhibiting groove 41 and the gas collecting groove 34*b* is five or more times the wire diameter of the mesh 47. The mesh 47 is formed of a material with a comparatively high corrosion resistance against chemicals and a comparatively high wetting ability with respect to chemicals. For example, when the chemical is a hydrophobizing treatment liquid, the mesh is formed of a stainless steel material.

A first blocking member 50 is provided at a position corresponding to the supply port 35*a* so as to cover the supply port 35*a*. More specifically, the first blocking member 50 (blocking member, guide member) covers only the supply port 35*a* and vicinity thereof and is surrounded by the circular-arc section 41*a* of the inhibiting groove 41. The first blocking member 50 is provided on the outside of the mesh 47 and is in contact with the mesh 47. Thus, the first blocking member 50 is in contact with the mesh 47 on the side opposite the main body 31 side, and the mesh 47 is sandwiched between the upper surface 31*c* of the main body 31 and the first blocking member 50.

Therefore, the first blocking member 50 is not in contact with the upper surface 31*c* of the main body 31, and the mesh 47 ensures a flow channel for the chemical between the upper surface 31*c* and the first blocking member 50. The first blocking member 50 is also formed of a material with a comparatively high corrosion resistance against chemicals and a comparatively high wetting ability with respect to chemicals.

Figure 5:
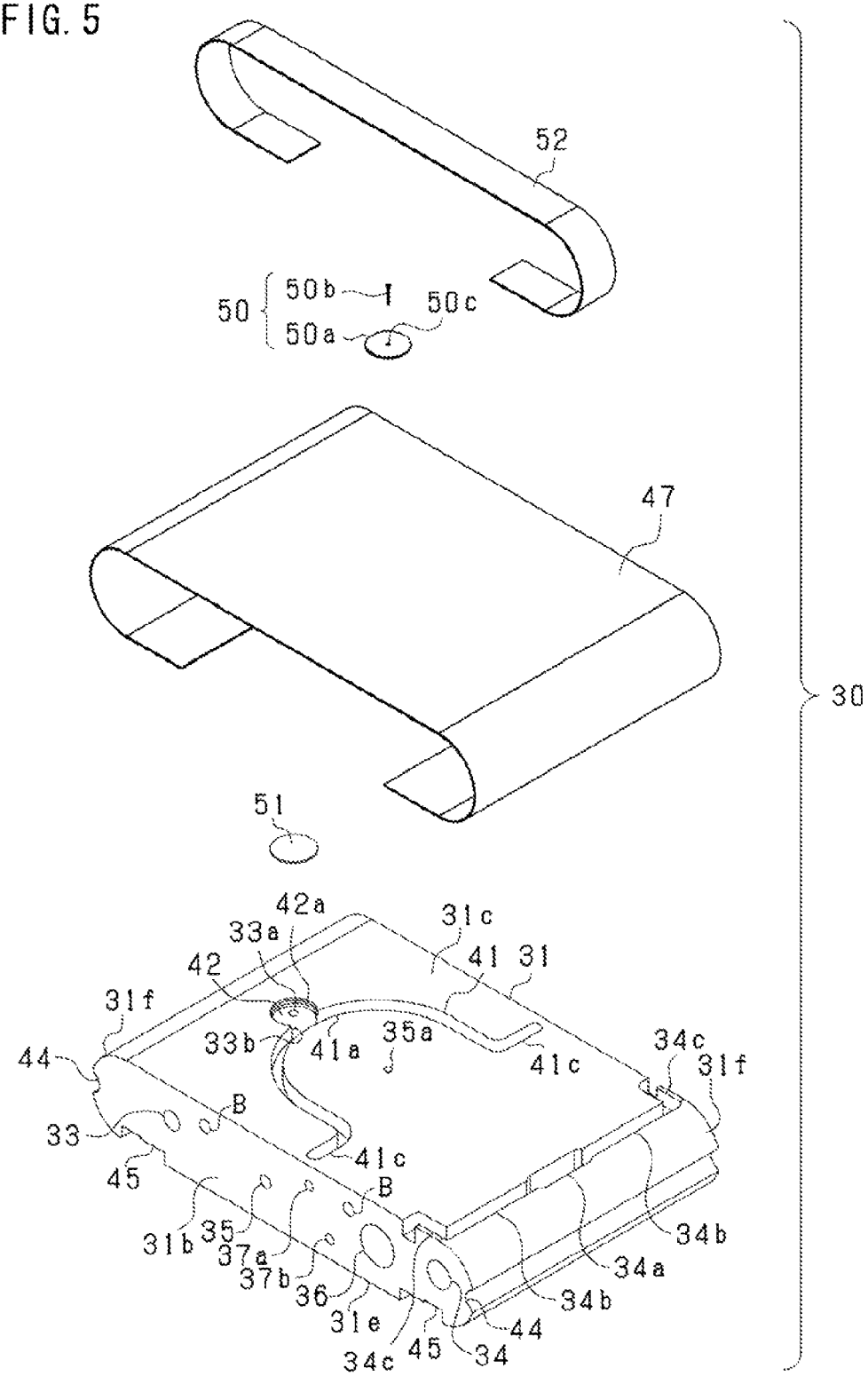
FIG. 5 is an exploded perspective view of the liquid control apparatus.

As shown in FIG. 5, a second blocking member 51 is provided at a position corresponding to the recess 42, so as to fit in the inner circumferential surface of the recess 42. The second blocking member 51 is press fitted into the inner circumferential surface of the recess 42, and the lower surface of the second blocking member 51 abuts against the upper surface of the step 42*a* of the recess 42. Therefore, the introducing port 33*a* is covered by the second blocking member 51. The space surrounded by the recess 42 and the second blocking member 51 is open in the introducing port 33*b* serving to introduce the gas into the inhibiting groove 41. Therefore, the gas is introduced from the inside of the main body 31 into the inhibiting groove 41 through the introducing port 33*a*, the above-mentioned space, and the introducing port 33*b*. In this case, the introducing port 33*b* is arranged in the side wall of the inhibiting groove 41. Thus, the introducing port 33*b* is formed such that the gas is introduced into the inhibiting groove 41 substantially parallel to the upper surface 31*c* (along the lower surface of the second blocking member 51). The introducing port 33*b* is open from the introducing port 33*a* toward the supply port 35*a*.

The upper surface of the second blocking member 51 is lower than the upper surface 31*c* of the main body 31. The mesh 47 is provided at the upper side of the second blocking member 51, that is, on the side opposite that of the main body 31 with respect to the second blocking member 51. In this state, a gap is formed between the second blocking member 51 and the mesh 47. Thus, no interface is formed between the second blocking member 51 and the mesh 47.

The second blocking member 51 overhangs in the width direction of the inhibiting groove 41 so as to cover part of the inhibiting groove 41. The second blocking member 51 overhangs to the intermediate section in the width direction (substantially to the half) of the inhibiting groove 41, rather than over the entire width of the inhibiting groove 41. Therefore, as shown in FIG. 3, in the portion where the second blocking member 51 is provided, the upper surface 31*c* is also made discontinuous by the inhibiting groove 41.

A mesh band 52 woven in a net-like shape is provided on the outer circumference of the main body 31 (mesh 47) so as to extend along the direction from the introducing port 33*a* to the discharge portion 34*a* (longitudinal direction of the upper surface 31*c*).

The mesh band 52 (guide member) covers the introducing port 33*a*, the upper portion of the introducing port 33*b*, the supply port 35*a* (first blocking member 50), and the discharge port 34*a*. Thus, the mesh band 52 extends from the introducing port 33*a* to the introducing port 33*b*, supply port 35*a*, thermocouple insertion holes 37*a* and 37*b* (thermocouples 83 and 84), heater insertion hole 24 (heater 80), and discharge port 34*a*, in that order. The introducing ports 33*a* and 33*b* are disposed in a portion where the inhibiting groove 41 and the mesh band 52 overlap each other (overlapping portion).

The mesh band 52 is provided outside the second blocking member 51, mesh 47, and first blocking member 50 and is in contact with the mesh 47 and the first blocking member 50. Thus, the mesh band 52 is in contact with the mesh 47 on the side opposite that of the main body 31, and the mesh 47 is sandwiched between the upper surface 31*c* of the main body 31 and the mesh band 52. Further, the first blocking member 50 is sandwiched between the mesh 47 and the mesh band 52.

The mesh band 52 is formed in a rectangular (band-like) shape and also formed to a size such that the introducing port 33*a*, the upper portion of the introducing port 33*b*, and the first blocking member 50 (supply port 35*a*) can be covered by the mesh band 52. More specifically, the diameter of the first blocking member 50 is substantially equal to the length of the mesh band 52 in the lateral direction. The length of the mesh band 52 in the longitudinal direction is larger than the sum total of the length of the upper surface 31*c* in the longitudinal direction and the length of the outer circumference of the curved surfaces 31*f*.

The mesh 47 is wound about the upper surface 31c and the two curved surfaces 31f. The mesh size of the mesh band 52 is set such that the chemical can easily create membranes in the openings of the mesh band 52, for example, 100 mesh having 100 openings per 1 inch. The mesh band 52 is also formed of a material with a comparatively high corrosion resistance against chemicals and a comparatively high wetting ability with respect to chemicals.

The end portions of the mesh 47 and the mesh band 52 in the longitudinal direction are fixed by mesh retainers 55a and 55b and the fixing member 56, respectively. More specifically, the end portions of the mesh 47 and the mesh band 52 are retained by the first retainer 55a inside the engagement groove 45, and the first mesh retainer 55a is retained by the second mesh retainer 55b.

The end portions of the mesh 47 and the mesh band 52 are led to the outside from between the first mesh retainer 55a and the second mesh retainer 55b. Thus, the end portions of the mesh 47 and the mesh band 52 are inserted between the first mesh retainer 55a and the second mesh retainer 55b.

Further, the fixing member 56 is engaged with the engagement groove 45 in a state in which the second mesh retainer 55b is pressed by the fixing member 56. As a result, the mesh retainers 55a and 55b and the fixing member 56 are fixed in a state of engagement with the engagement groove 45. When the fixing member 56 is constituted by a screw (this configuration is not shown in the figure), the second mesh retainer 55b is fastened by the screw to the main body 31.

In this case, the mesh 47 and the mesh band 52 are fixed in a state of being tensioned in the longitudinal directions of them. Therefore, the mesh 47 is attached closely to the upper surface 31c of the main body 31 and the curved surface 31f, and the mesh band 52 is closely attached to the mesh 47. Further, the first blocking member 50 is in a state of being closely attached to the mesh 47 and the mesh band 52.

The procedure of assembling the liquid control apparatus 30 will be described below. FIG. 5 is an exploded perspective view of the liquid control apparatus 30. As shown in the figure, the first blocking member 50 has a disk-shaped disk section 50a and a needle-shaped pin 50b. A through hole 50c is formed in the center of the disk section 50a (first portion). A sharp tip is formed at one end of the pin 50b (second portion), and a head section with a diameter larger than that of the tip is provided at the other end of the pin. The diameter of the head section of the pin 50b is larger than the diameter of the through hole 50c, and the diameter of portions of the pin 50b other than the head section thereof is less than the diameter of the through hole 50c. The diameter of the tip of the pin 50b is less than the distance of 0.15 mm between the wires of the mesh 47.

First, the second blocking member 51 is fitted into the recess 42 of the main body 31. As a result, the upper portion of the recess 42 is covered by the second blocking member 51. And a gas passage (space) connecting the introducing port 33a with the introducing port 33b and then with the inhibiting groove 41 is formed by the inner circumferential surface of the recess 42 and the lower surface of the second blocking member 51. Then, the longitudinal direction of the upper surface 31c of the main body 31 and the longitudinal direction of the mesh 47 are matched and the mesh 47 is wound on the entire circumference of the main body 31. In this case, a state is assumed in which the mesh 47 covers the entire upper surface 31c and curved surfaces 31f, with extra sections being left at both ends. The mesh 47 is in contact with the upper surface 31c, except for the portions where the second blocking member 51, inhibiting groove 41, supply port 35a, discharge port 34a, gas collecting groove 34b, and extension section 34c are formed.

The disk section 50a of the first blocking member 50 is then attached so as to cover the supply port 35a from the outer side of the mesh 47. In this case, the position of the center of the supply port 35a is aligned with the position of the center (through hole 50c) of the disk section 50a. The tip of the pin 50b is then inserted into the through hole 50c of the disk section 50a, and the pin 50b is pushed through the mesh 47 and inserted into the supply port 35a. In this case, since the diameter of the tip of the pin 50b is less than the distance between the wires of the mesh 47, the tip can be inserted between the wires of the mesh 47. The head section of the pin 50b abuts against the disk section 50a, thereby stopping the insertion of the pin 50b.

The longitudinal direction of the upper surface 31c of the main body 31 is then aligned with the longitudinal direction of the mesh band 52, and the mesh band 52 is wound on the outer circumference of the main body 31. More specifically, the mesh band 52 is wound so as to overlap the supply port 33a, introducing port 33b, supply port 35a (first blocking member 50), and discharge port 34a. In this case, the mesh band 52 covers the upper surface 31c and the curved surfaces 31f, with extra sections being left at both ends.

Then, as shown in FIG. 2B, FIG. 2C, and FIG. 3, in the engagement groove 45, the end portions of the mesh 47 and the mesh band 52 are respectively pre-fixed by the first mesh retainer 55a. In this state or in a state in which the first mesh retainer 55a is retained by the second mesh retainer 55b, the mesh 47 and the mesh band 52 are tensioned in the longitudinal directions thereof. As a result, a state is obtained in which wrinkles of the mesh 47 and the mesh band 52 are smoothed out and a tension is generated in the mesh 47 and the mesh band 52. The mesh retainers 55a and 55b are then fixed by the fixing member 56 and the assembly of the liquid control apparatus 30 is completed.

The liquid control apparatus 30 assembled in the above-described manner is attached to the side surface 20b of the second housing 20 by using a fastening member in a through hole B formed in the main body 31 as described hereinabove. An elliptical tubular gap is thus formed between the inner circumferential surface of the first housing 11 and the main body 31.

In a state in which the mesh 47 and the mesh band 52 are wound about and fixed to the outer circumferential of the main body 31, gaps appear between the recesses 44 of the curved surfaces 31f and the mesh 47 (the mesh band 52). Accordingly, as shown in FIG. 2C, an insertion member 57 is inserted from the axial line direction (lateral direction of the upper surface 31c) of the main body 31 between the first housing 11 and mesh 47 (mesh band 52) so as to engage with the recess 44.

The insertion member 57 is formed in a round rod shape, and the radius of the cross section of the insertion member 57 is substantially equal to the curvature radius of the recess 44. The distal end portion of the insertion member 57 is slightly narrower than the other portions. And the insertion member 57 is inserted into the recess 44 from the distal end portion of the insertion member 57, thereby the mesh 47 and the mesh band 52 are pressed against the recess 44. As a result, the gap between the recess 44 and the mesh 47 (the mesh band 52) is contracted, and the tension generated in the mesh 47 and the mesh band 52 can be increased. As a result, the mesh 47 and the mesh band 52 are strongly and closely attached to the main body 31.

Figure 6:
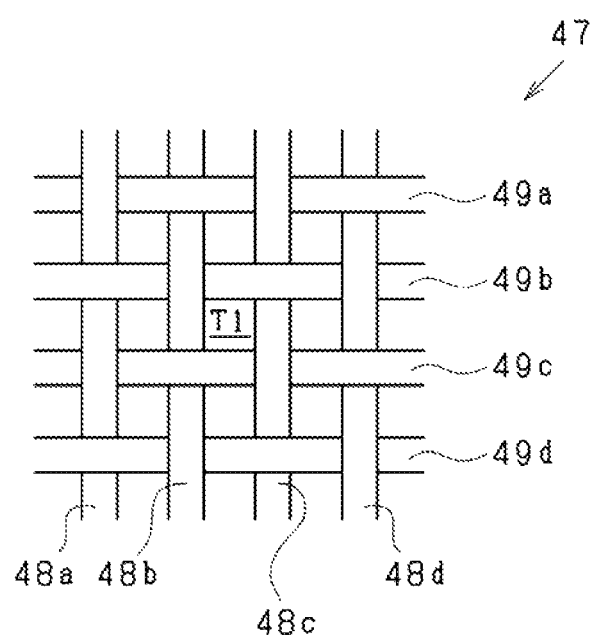
FIG. 6 is an expanded plan view of a mesh.

The principle of spreading the chemical that has come into contact with the upper surface 31c of the main body 31 with the mesh 47, mesh band 52, and first blocking member 50 will be explained below. FIG. 6 is an enlarged plan view of the mesh 47. The mesh 47 is formed by weaving vertical wires 48a, 48b and 48c, 48d and transverse wires 49a, 49b and 49c, 49d in a net-like shape.

In a planar view, mesh spaces surrounded by the vertical wires and transverse wires are formed in the mesh 47. The mesh spaces are in the form of rectangular parallelepipeds (squares in a planar view) and formed equidistantly in the vertical direction and transverse direction of the mesh 47. For example, a mesh space T1 is a fine space (0.15 mm×0.15 mm×thickness of mesh 47) surrounded by two vertical wires 48b and 48c and two transverse wires 49b and 49c.

Since the mesh space T1 is a fine space, comparatively strong intermolecular forces act between the wires 48b, 48c, 49b and 49c and the chemical. As a result, the chemical is attracted to the mesh space T1 and a chemical membrane is formed so as to close the mesh space T1 (capillary effect). In this state, the chemical is attracted to each mesh space, and the action causing the chemical to spread over the surface of the mesh 47 is comparatively weak.

Figure 7:
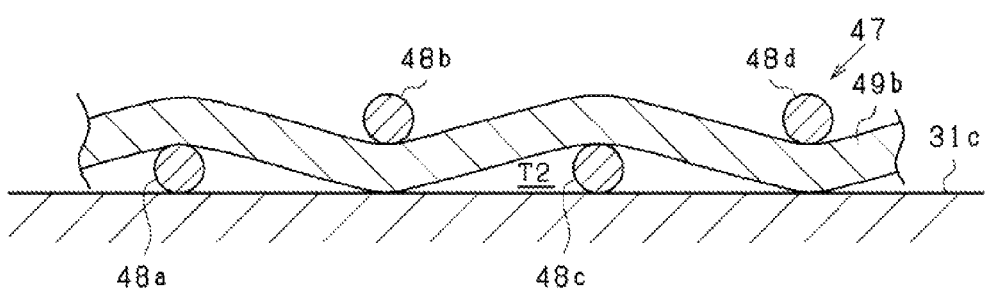
FIG. 7 is an enlarged cross-sectional view of the upper surface of the main body and the mesh.

FIG. 7 is an enlarged cross-sectional view of the upper surface 31c of the main body 31 and the mesh 47. As shown in the figure, a circulation space T2 surrounded by upper surface 31c, vertical wires, and transverse wires in a side view is formed between the upper surface 31c of the main body 31 and the mesh 47. The circulation space T2 is obtained by connection of gaps formed between the upper surface 31c and the vertical wires and between the upper surface 31c and transverse wires; this space spreads along the upper surface 31c.

In the portions where the vertical wires 48a, 48b, 48c, and 48d are in contact with the upper surface 31c (intersection portions of the wires), the transverse wires 49a, 49b, 49c, and 49d are separated from the upper surface 31c. Meanwhile, in the portions where the transverse wires 49a, 49b, 49c, and 49d are in contact with the upper surface 31c (intersection portions of the wires), the vertical wires 48a, 48b, 48c, and 48d are separated from the upper surface 31c. Therefore, the circulation space T2 extends continuously along the upper surface 31c, without being cut off by the vertical wires and transverse wires.

A large number of fine interfaces are formed between the upper surface 31c and the vertical wires and between the upper surface 31c and transverse wires. Therefore, the chemical supplied to the upper surface 31c spreads through the circulation space T2 along the upper surface 31c (capillary effect) under the effect of interface tension at a large number of fine interfaces. Furthermore, since the chemical demonstrates wetting ability with respect to the upper surface 31c, vertical wires, and transverse wires, the spread of the chemical along the upper surface 31c is enhanced.

Figure 8:
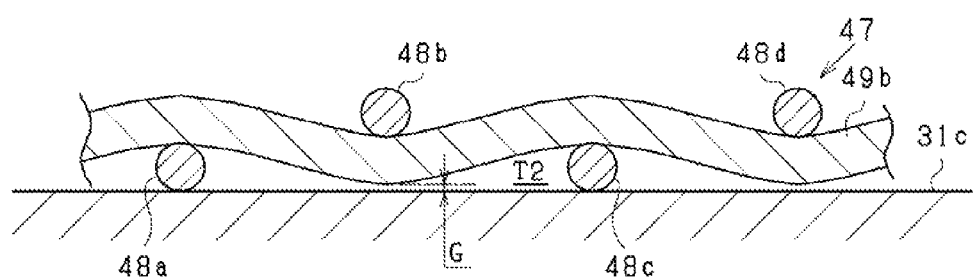
FIG. 8 is an enlarged cross-sectional view of the upper surface of the main body and the mesh.

FIG. 8 is an enlarged cross-sectional view of the upper surface 31c of the main body 31 and the mesh 47. This figure shows a state in which parts of the transvers wire 49b are separated from the upper surface 31c, and gaps G are formed. In this state, the chemical is also spread by the interface tension in the circulation space T2. In other words, the upper surface 31c and the vertical lines and transverse lines may be partially separated.

Figure 9:
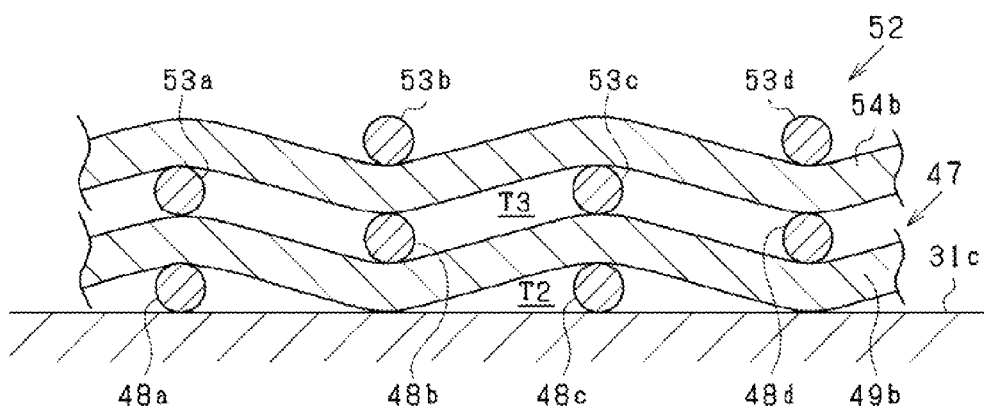
FIG. 9 is an enlarged cross-sectional view of the upper surface of the main body, mesh, and mesh band.

FIG. 9 is an enlarged cross-sectional view of the upper surface 31c of the main body 31, mesh 47, and mesh band 52. As shown in the figure, a circulation space T3 surrounded by the vertical wires and transverse wires of the mesh 47 and the vertical wires and transverse wires of the mesh band 52 in the side view is formed between the mesh 47 and the mesh band 52 in addition to the circulation space T2. The circulation space T3 is obtained by connection of gaps between the vertical wires (transverse wires) of the mesh 47 and the vertical wires (transverse wires) of the mesh band 52 and spreads substantially parallel to the upper surface 31c.

In the portions where the vertical wires 53a, 53b, 53c and 53d of the mesh band 52 are in contact with the transverse wires of the mesh 47 (intersection portions of the wires), the transverse wires of the mesh band 52 are separated from the transverse wires of the mesh 47. Meanwhile, in the portions where the transverse wires of the mesh band 52 are in contact with the vertical wires of the mesh 47 (intersection portions of the wires), the vertical wires 53a, 53b, 53c, and 53d of the mesh band 52 are separated from the vertical wires of the mesh 47. Therefore, the circulation space T3 extends continuously substantially parallel to the upper surface 31c, without being cut off by the vertical wires and transverse wires.

A large number of fine interfaces are formed between the vertical wires (transverse wires) of the mesh 47 and the vertical wires (transverse wires) of the mesh band 52. Therefore, the chemical supplied to the upper surface 31c spreads through the circulation space T2 along the upper surface 31c and also spreads substantially parallel to the upper surface 31c through the circulation space T3 under the effect of interface tension at a large number of fine interfaces (capillary effect). Furthermore, since the chemical demonstrates wetting ability with respect to the upper surface 31c, vertical wires and transverse wires of the mesh 47, and vertical wires and transverse wires of the mesh band 52, the spread of the chemical is enhanced. This figure shows a state in which the positions of the vertical wires of the mesh 47 and vertical wires of the mesh band 52 and the positions of the transverse wires of the mesh 47 and the transverse wires of the mesh bands 52 match, but those positions may be shifted with respect to each other.

Figure 10:
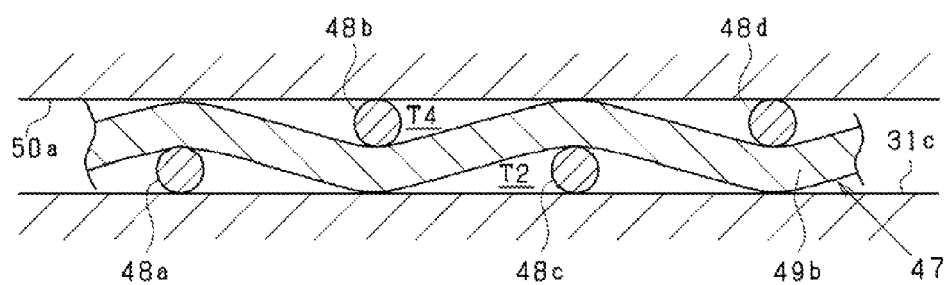
FIG. 10 is an enlarged cross-sectional view of the upper surface of the main body, mesh, and blocking member.

FIG. 10 is an enlarged cross-sectional view of the upper surface 31c of the main body 31, the mesh 47, and the first blocking member 50. As shown in the figure, a circulation space T4 bounded by the disk section 50a, vertical wires, and transverse wires, in the side view thereof, is formed between the disk section 50a of the first blocking member 50 and the mesh 47, in addition to the above-mentioned circulation space T2. The circulation space T4 is formed similarly to the circulation space T2 and is a space in which gaps between the lower surface of the disk section 50a and the vertical and transverse wires are connected to each other. And the circulation space T4 spreads along the lower surface of the disk section 50a.

Therefore, the chemical supplied to the upper surface 31c spreads through the circulation space T2 along the upper surface 31c and also spreads through the circulation space T4 along the lower surface of the disk section 50a (capillary effect) under the effect of interface tension at a large number of fine interfaces. Furthermore, since the chemical demonstrates wetting ability with respect to the upper surface 31c, lower surface of the disk section 50a, vertical wires and transverse wires, the spread of the chemical is enhanced.

The operation of the liquid vaporizer 10 will be explained below with reference to FIGS. 1 and 3. In this case, an example will be explained in which a chemical (for example, hydrophobizing treatment liquid) vaporized by the liquid control apparatus 30 is mixed with an inactive gas (for example, nitrogen) and supplied to the next device.

Where the inactive gas is introduced from the first gas pipe 26b, the inactive gas is jetted out from the introducing port 33a of the main body 31 through the first gas flow channel 21 and the first main body flow channel 33. In this case, the introducing port 33a is covered by the second cut off member 51 with a gap with a size of the step 42a of the recess 42. Therefore, the inactive gas is introduced into the introducing port 33b through a passage formed by the recess 42 and the second blocking member 51. Since the introducing port 33b is formed in the side wall of the inhibiting groove 41, the inactive gas is introduced into the inhibiting groove 41 substantially parallel to the upper surface 31c of the main body 31. The inactive gas introduced into the inhibiting groove 41 travels in the direction parallel to the upper surface 31c and flows through along the inhibiting groove 41. As a result, the inactive gas is prevented from being jetted out directly from the openings of the mesh 47. Further, the flow of the inactive gas along the inhibiting groove 41 is also facilitated by the inhibiting groove 41 being covered by the mesh 47. The inactive gas is jetted out from the openings of the mesh 47, while flowing through to a wide range of the inhibiting groove 41. As a result, the inactive gas is introduced into the columnar space S in the first housing 11.

The inactive gas then flows through the gap formed by the inner circumferential surface of the first housing 11 and the main body 31 of the liquid control apparatus 30 and flows into the discharge port 34a. The inactive gas that has flown into the discharge port 34a is discharged from the second gas pipe 27b through the second main body flow channel 34 and the second gas flow channel 22. The second gas pipe 27b is connected to the next device, and the inactive gas discharged from the second gas pipe 27b is supplied to the next device.

Where the chemical is supplied from the chemical pipe 28b, the chemical is supplied from the supply port 35a of the main body 31 to the upper surface 31c through the chemical flow channels 23 and 35. In this case, the chemical supplied from the supply port 35a is in contact with the first blocking member 50 covering the supply port 35a and, therefore, the chemical is prevented from being jetted out through the mesh 47 or the mesh band 52. Further, since the pin 50b of the first blocking member 50 is inserted into the supply port 35a, the first blocking member 50 is prevented from shifting from the supply port 35a even though the pressure of the chemical acts upon the first blocking member 50. Furthermore, the pin 50b can be also used for positioning the first blocking member 50 with respect to the supply port 35a.

As shown in FIG. 10, between the upper surface 31c of the main body 31 and the disk section 50a of the first blocking member 50, the supplied chemical spreads through the circulation space T2 along the upper surface 31c and also spreads through the circulation space T4 along the lower surface of the disk section 50a under the effect of interface tension at a large number of fine interfaces. Therefore, in this portion, the chemical spreads faster than in the portion where only the mesh 47 is provided with respect to the upper surface 31c.

The chemical flows through below the disk section 50a of the first blocking member 50 and further spreads to the periphery. In the portion where only the mesh 47 is provided with respect to the upper surface 31c, as shown in FIG. 7, the chemical spreads through the circulation space T2 along the upper surface 31c under the effect of interface tension at a large number of fine interfaces. Meanwhile, in the portion where the mesh 47 and the mesh band 52 are provided with respect to the upper surface 31c, as shown in FIG. 9, the chemical spreads through the circulation space T2 along the upper surface 31c and also spreads through the circulation space T3 substantially parallel to the upper surface 31c under the effect of interface tension at a large number of fine interfaces. Therefore, the chemical that has flown through the disk section 50a of the first blocking member 50 spreads preferentially along the mesh band 52.

Further, part of the chemical that has spread along the upper surface 31c to a surrounding area of the first blocking member 50 reaches the inhibiting groove 41 of the upper surface 31c. In the portion where the inhibiting groove 41 is formed, no interface is formed between the upper surface 31c and the mesh 47 and, therefore, the spread of the chemical is inhibited. Furthermore, since the inactive gas is blown through the openings of the mesh 47 in the portion where the mesh is covered by the inhibiting groove 41, the chemical is effectively prevented from spreading across the inhibiting groove 41. Thus, the inactive gas jetted out from the openings of the mesh 47 in the portion of the inhibiting groove 41 acts as an air curtain blocking the chemical.

In particular, in a portion where the inhibiting groove 41 and the mesh band 52 overlap each other, the chemical can spread across the inhibiting groove 41 by flowing along the mesh band 52. However, since the inactive gas is jetted out onto the mesh band 52 from the introducing ports 33a and 33b formed in a portion where the inhibiting groove 41 and the mesh band 52 overlap each other, the chemical can be prevented from spreading across the inhibiting groove 41 by propagating along the mesh band 52.

Further, the second blocking member 51 is not present over the entire width of the inhibiting groove 41, and the upper surface 31c is made discontinuous by the inhibiting groove 41 even in the portion where the second blocking member 51 is provided. Therefore, the chemical can be prevented from spreading across the inhibiting groove 41 by propagating along the second blocking member 51.

In the portion where the second blocking member 51 and the mesh 47 overlap each other, a gap is formed between the second blocking member 51 and the mesh 47. Therefore, no interface is formed between the second blocking member 51 and the mesh 47 and the chemical can be prevented from spreading across the second blocking member 51.

In this case, the circular-arc section 41a of the inhibiting groove 41 surrounds the periphery of the supply port 35a, except for the heater insertion hole 36 (heater 80) side and the thermocouple insertion holes 37a and 37b (thermocouples 83 and 84) side. Therefore, the spread of the chemical in the direction to the outside of the heater 80 and the thermocouples 83 and 84 side is inhibited. As a result, the amount of the chemical flowing through to the heater 80 side and the thermocouples 83 and 84 side is increased and the spread of the chemical to the heater 80 side and the thermocouples 83 and 84 side is enhanced. The spread of the chemical to the heater 80 side and the thermocouples 83 and 84 side is also enhanced by the linear section 41c of the inhibiting groove 41.

The hater 80 is inserted into the heater insertion hole 36, and the upper surface 31c of the main body 31 is heated by the heater 80. In this case, since the spread of the chemical to the heater 80 side is enhanced by the mesh band 52 and the inhibiting groove 41, the efficiency of heating the chemical with the heater 80 can be increased. Furthermore, since the mesh band 52 is formed by weaving in a net-like shape, the evaporation of the chemical through the mesh band 52 is enhanced by comparison with the case in which the mesh band 52 is formed in a sheet-like or film-like shape. Therefore, the mesh band 52 enhances the spread of the chemical to the heater 80 side, while maintaining good evaporation of the chemical.

When the chemical supplied to the upper surface 31c is evaporated, the temperature of the upper surface 31c is decreased by the vaporization heat of the chemical. Therefore, by detecting the temperature in the vicinity of the upper surface 31c with the first thermocouple 83, it is possible to estimate the degree of vaporization of the chemical. In this case, since the spread of the chemical to the first thermocouple 83 side is enhanced by the mesh band 52 and the inhibiting groove 41, the drop in temperature of the upper surface 31c caused by the vaporization of the chemical is sensitively reflected in the detection value of the first thermocouple 83. Therefore, the degree of vaporization of the chemical can be estimated more accurately. Further, since the temperature in a position close to the lower surface 31e of the main body 31 can be detected by the second thermocouple 84, the detection value thereof can be used for control in which the upper surface 31c is heated by the heater 80.

Further, the inactive gas that has been jetted out from the openings of the mesh 47 in a portion of the inhibiting groove 41, passes above the supply port 35a, first thermocouple 83, and heater 80 in that order and is discharged from the discharge port 34a. Therefore, the inactive gas also enhances the spread of the chemical from the supply port 35a to the heater 80 side and the thermocouples 83 and 84 side. Vapors generated by the evaporation of the chemical are pushed by the inactive gas and guided in the direction of the discharge port 34a. In this case, the inhibiting groove 41 is provided over the entire length in the lateral direction of the main body 31 on the side opposite that of the discharge port 34a with respect to the supply port 35a. Therefore, vapors of the chemical can be effectively guided in the direction of the discharge port 34a by the inactive gas jetted out from the openings of the mesh 47 in part of the inhibiting groove 41.

The gas collecting groove 34b extending in the direction substantially perpendicular to the direction from the supply port 35a to the discharge port 34a is connected to the discharge port 34a. Therefore, the chemical and vapors of the chemical spreading to the outside from the direction from the supply port 35a to the discharge port 34a are guided by the gas collecting groove 34b to the discharge port 34a.

In this case, at the outer edge of the upper surface 31c, the chemical is easily spread by the interface tension along the boundary of the main body 31 and the second housing 20, more specifically along the boundary of the upper surface 31c of the main body 31 and the side surface 20b of the second housing 20. In this regard, the chemical spreading along the outer edge of the upper surface 31c flows into the extension sections 34c that extend in the direction from the discharge port 34a to the supply port 35a and then extend to the outer edges of the upper surface 31c in the direction substantially perpendicular to the direction from the supply port 35a to the discharge port 34a. Therefore, the chemical spreading along the outer edge of the upper surface 31c can be guided by the gas collecting groove 34b to the discharge port 34a.

The chemical that has flown through the discharge port 34a into the second main body flow channel 34 flows through the second main body flow channel 34 and the second gas flow channel 22. Then, the chemical accumulated in the lower portion of the second gas flow channel 22 is discharged from the liquid pipe 29b. Where the chemical flows into the liquid pipe 29b, the inflow of the chemical is detected by the liquid sensor 29c. Therefore, when the amount of chemical supplied from the supply port 35a is too large or when the heater 80 is not switched on, it is possible to detect that the chemical is not evaporated adequately.

The effects demonstrated in the present embodiment explained in detail hereinabove are described below.

Since the mesh 47 is woven in a net-like shape and provided so as to be in contact with the upper surface 31c of the main body 31, a plurality of interfaces is formed between the upper surface 31c and the mesh 47. Therefore, the chemical supplied to the upper surface 31c is spread along the upper surface 31c by the interface tension at the plurality of interfaces.

In this case, since the inhibiting groove 41 is formed in a portion of the upper surface 31c that is in contact with the mesh 47, no interface is formed between the upper surface 31c and the mesh 47 in this portion of the inhibiting groove 41 and the spread of the chemical is inhibited. Therefore, by adjusting the arrangement of the inhibiting groove 41, it is possible to control the spread direction of the chemical that has come into contact with the upper surface 31c and the chemical can be preferentially spread in the desired direction. Furthermore, since the inactive gas is introduced into the inhibiting groove 41 from the inside of the main body 31 through the introducing port 33b, the inactive gas flows through in the flow channel formed by the inhibiting groove 41 and the mesh 47. As a result, the chemical can be effectively prevented from spreading across the inhibiting groove 41 by the inactive gas that flows through inside the inhibiting groove 41 and is jetted out from the openings of the mesh 47.

Since the inactive gas is introduced in the inhibiting groove 41 substantially parallel to the upper surface 31c through the introducing port 33b, the inactive gas easily flows through inside the inhibiting groove 41 in the direction parallel to the upper surface 31c. Therefore, the inactive gas located inside the inhibiting groove 41 can be prevented from being jetted out directly from the openings of the mesh 47, and the inactive gas is easily caused to flow through along the inhibiting groove 41. As a result, the inactive gas can be jetted out from the openings of the mesh 47 over a wide range of the inhibiting groove 41, and the chemical can be effectively prevented from spreading in a wide range of the inhibiting groove 41.

The chemical is supplied from the inside of the main body 31 to the upper surface 31c through the supply port 35a, and the chemical spreads along the upper surface 31c under the effect of the mesh 47. The chemical spreading along the upper surface 31c is actively evaporated and converted into vapors and also prevented from spreading in a portion of the inhibiting groove 41. In this case, since the supply port 35a is disposed between the inhibiting groove 41 and the discharge port 34a, the chemical and vapors of the chemical are pushed in the direction from the inhibiting groove 41 to the discharge port 34a by the inactive gas that flows through inside the inhibiting groove 41 and is jetted out from the openings of the mesh 47. As a result, the chemical and vapors of the chemical are easily discharged from the discharge port 34a.

Since the gas collecting groove 34b connected to the discharge port 34a is formed in the upper surface 31c, the chemical and vapors of the chemical that have flown into the gas collecting groove 34b are easily guided into the discharge port 34a. As a result, the chemical and vapors of the chemical can be smoothly discharged from the discharge port 34a.

Since the gas collecting groove 34b extends in the directions substantially perpendicular to the direction from the supply port 35a to the discharge port 34a in the upper surface 31c, the chemical and vapors of the chemical spreading outside from the direction from the supply port 35a to the discharge port 34a are easily collected by the gas collecting groove 34b.

Since the main body 31 is disposed such that the upper surface 31c is on the upper side, the chemical that has flown into the inhibiting groove 41 accumulates in the bottom section of the inhibiting groove 41. Therefore, the chemical that has flown into the inhibiting groove 41 can be prevented from flowing in reverse to the mesh 47 side. As a result, the chemical can be effectively prevented from spreading across the inhibiting groove 41. Further, the chemical that has flown into the gas collecting groove 34b accumulates in the bottom portion of the gas collecting groove 34b. The chemical that has accumulated inside the gas collecting groove 34b is easily guided along the gas collecting groove 34b to the discharge port 34a. Therefore, the chemical that has flown into the gas collecting groove 34b can be even more smoothly discharged from the discharge port 34a.

The mixed gas of the chemical vapors and inactive gas is discharged from the space on the periphery of the upper surface 31c into the main body 31 through the discharge port 34a formed in the main body 31. The mixed gas is discharged from the inside of the main body 31 through the second main body flow channel 34 and the second gas flow channel 22 connected to the discharge port 34a. In this case, since the main body 31 is disposed so that the upper surface 31c is on the upper side, the chemical that has flown into the second gas flow channel 22 through the discharge port 34a and the second main body flow channel 34 accumulates in the lower portion of the second gas flow channel 22. Since the liquid pipe 29b branches off from the lower portion of the second gas flow channel 22, the chemical accumulated in the lower portion of the second gas flow channel 22 can be discharged from the liquid pipe 29b. As a result, the mixed gas and chemical flowing through inside the second gas flow channel 22 can be adequately separated.

When the chemical flows into the second gas flow channel 22 due to some abnormality, the inflow of chemical can be detected by the liquid sensor 29c.

The chemical is prevented from spreading from the supply port 35a to a side opposite that of the heater 80 by the inhibiting groove 41 formed in the upper surface 31c. Since the chemical is prevented from spreading to the side opposite that of the heater 80, the spread of the chemical to the heater 80 side is enhanced. As a result, heating of the chemical by the heater 80 can be enhanced and the evaporation of the chemical can be further enhanced.

The chemical is prevented from spreading from the supply port 35a to the side opposite that of the thermocouples 83 and 84 by the inhibiting groove 41 formed in the upper surface 31c. Further, since the chemical is prevented from spreading to the side opposite that of the thermocouples 83 and 84, the spread of the chemical to the thermocouples 83 and 84 side can be enhanced. As a result, the decrease in temperature of the upper surface 31c caused by vaporization of the chemical is sensitively reflected in the detection values of the thermocouples 83 and 84 and, therefore, the degree of vaporization of the chemical can be estimated more accurately.

Since the mesh band 52 is provided so as to be in contact with the mesh 47 on the side opposite the main body 31 side, a plurality of interfaces is also formed between the mesh 47 and the mesh band 52. Therefore, the chemical is also spread by the interface tension between the mesh 47 and the mesh band 52. Thus, the spread of the chemical in the portion where the mesh band 52 is provided can be enhanced by comparison with that in other portions. As a result, by adjusting the arrangement of the mesh band 52, it is possible to spread preferentially the chemical that is in contact with the upper surface 31c in the desired direction.

Since the inactive gas is introduced in the inhibiting groove 41 from the introducing ports 33a and 33b arranged in the portion where the inhibiting groove 41 and the mesh band 52 overlap each other, the amount of the inactive gas blown onto the mesh band 52 can be increased. As a result, the chemical can be prevented from spreading across the inhibiting groove 41 by propagating along the mesh band 52.

The embodiment can be also implemented with the following variations. The parts same as those in the above-mentioned embodiment are assigned with same reference numerals and the explanation of them is herein omitted.

Figure 11:
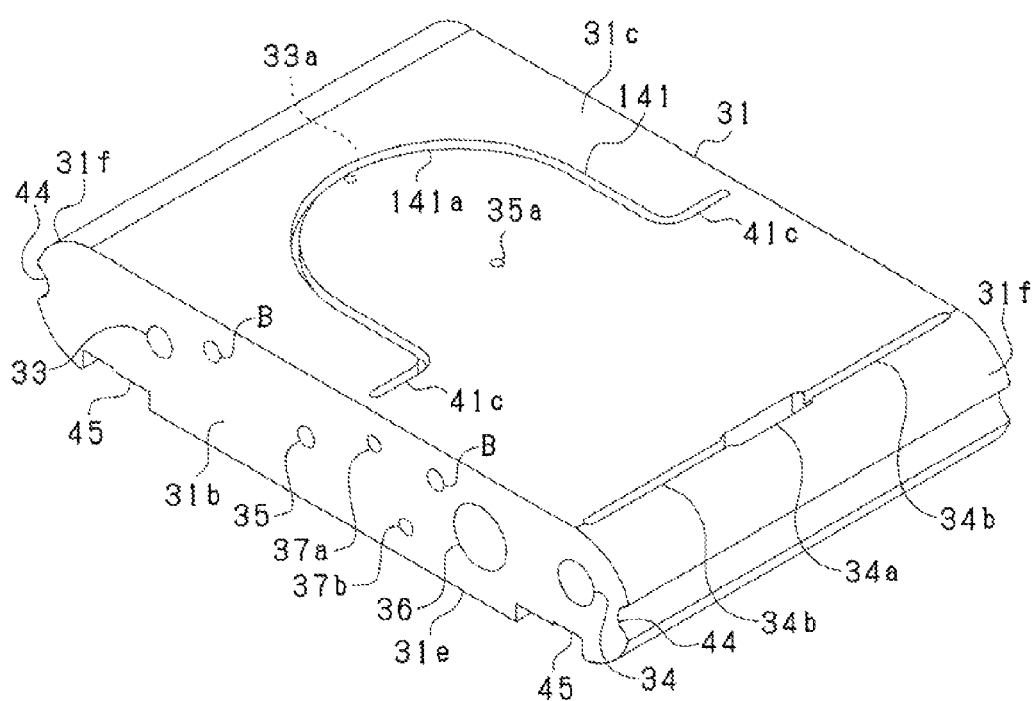
FIG. 11 is a perspective view illustrating a variation example of the main body of the liquid control apparatus.

FIG. 11 is a perspective view illustrating a variation example of the main body 31 of the liquid control apparatus 30. As shown in the figure, the configuration in which the introducing port 33a directly communicates with a circular-arc section 141a of an inhibiting groove 141 can be also used. With such a configuration, the inactive gas is also introduced into the inhibiting groove 141 from the inside of the main body 31 through the introducing port 33a. Therefore the inactive gas can be caused to flow inside the flow channel formed by the inhibiting groove 141 and the mesh 47. Further, the chemical can be prevented from spreading across the inhibiting groove 141 by the inactive gas flowing through inside the inhibiting groove 141 and jetting out from the openings of the mesh 47.

Figure 12:
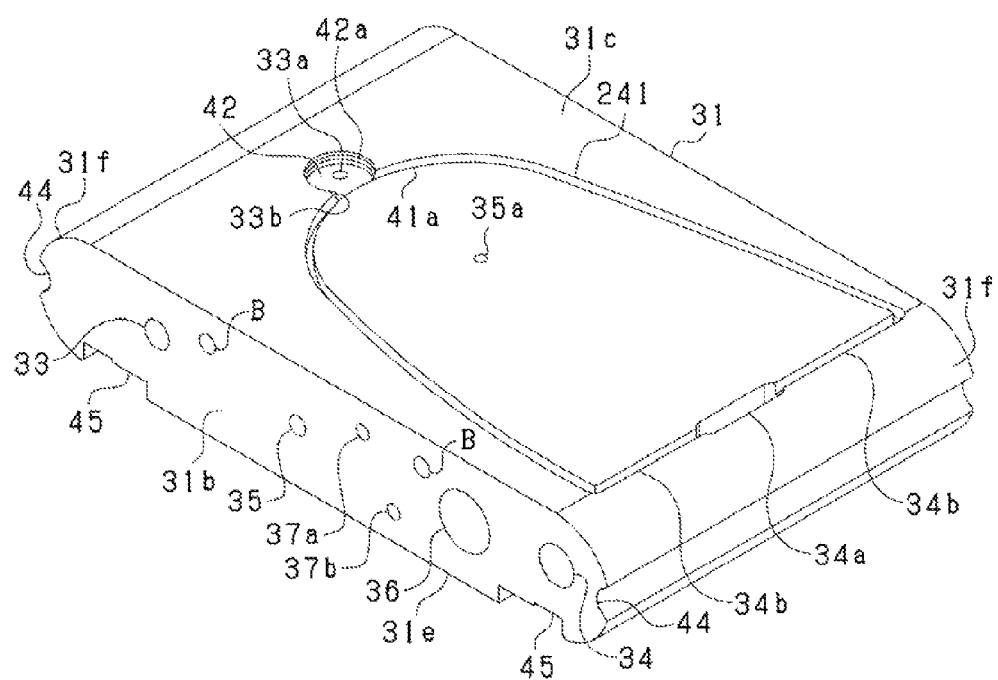
FIG. 12 is a perspective view illustrating another variation example of the main body of the liquid control apparatus.

FIG. 12 is a perspective view illustrating another variation example of the main body 31 of the liquid control apparatus 30. As shown in the figure, it is also possible to use the inhibiting groove 241 connecting the introducing port 33b and the discharge port 34a in the upper surface 31c of the main body 31. With such a configuration, not only the chemical flowing into the gas collecting groove 34b, but also the chemical flowing into the inhibiting groove 241 can be guided to the discharge port 34a. Further, the inhibiting groove 241 surrounds the entire periphery of the supply port 35a. Therefore, the chemical can be prevented from leaking out from the upper surface 31c.

Figure 13:
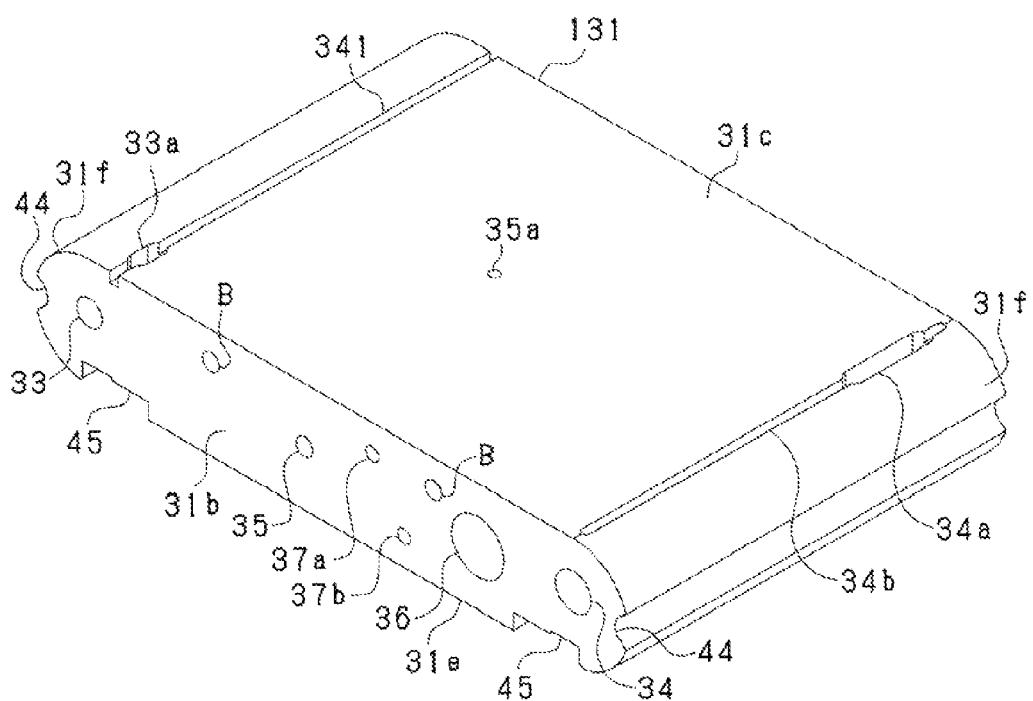
FIG. 13 is a perspective view illustrating yet another variation example of the main body of the liquid control apparatus.

FIG. 13 is a perspective view illustrating another variation example of the main body 31 of the liquid control apparatus 30. As shown in the figure, in the main body 131, the introducing port 33a and the discharge port 34a are formed on a diagonal line of the upper surface 31c. An inhibiting groove 341 parallel to the gas collecting groove 34b is formed in the upper surface 31c, and the introducing port 33a communicates with the inhibiting groove 341. With such a configuration, the inactive gas introduced into the inhibiting groove 341 also flows through along the inhibiting groove 341. The inactive gas jetted out from the openings of the mesh 47 in a portion of the inhibiting groove 341 passes above the supply port 35a, thermocouple insertion holes 37a and 37b (thermocouples 83 and 84), and heater insertion hole 36 (heater 80) in that order and is discharged from the discharge port 34a. Therefore, the inactive gas makes it possible to enhance the spread of the chemical from the supply port 35a to the heater 80 side and the thermocouples 83 and 84 side and also enhance the flow-through of the chemical vapors.

The first blocking member 50 can be provided outside the mesh band 52. Further, the first blocking member 50 may cover the supply port 35a and the shape of the first blocking member 50 may be changed as necessary.

The weaving method of the mesh 47 and mesh band 52 is not limited to flat weaving, and another weaving method such as twill can be used. Further, the coarseness of the mesh 47 or the mesh band 52 is desirably set, as appropriate, within a range of 100 mesh to 500 mesh according to the wetting ability of the chemical with respect to the mesh and mesh band, wetting ability of the chemical with respect to the main body 31, viscosity of the chemical, or the like.

In the above-described embodiments, the mesh band 52 is woven in a net-like shape, but it can also be formed as a membrane. In this case, the band formed in a membrane shape demonstrates the function of the first blocking member 50. Therefore, the first blocking member 50 may be omitted. Further, the first blocking member 50 may be also omitted when the supply pressure of the chemical is low and the probability of the chemical being jetted out through the mesh 47 and the mesh band 52 is low. Conversely, in a portion where the first blocking member 50 is provided, the mesh band 52 may be omitted. Thus, the mesh band 52 can be provided only in a portion where the first blocking member 50 is not provided. The mesh band 52 can be also formed in a sheet-like shape.

The main body 31 is not limited to the columnar shape with an elliptical bottom surface, and another shape such as a rectangular parallelepiped shape can be also used. The upper surface 31c (supply surface) of the main body 31 is not limited to a flat surface and a curved surface can be also used.

The chemical is not limited to a hydrophobizing treatment liquid (HMDS), and other chemicals such as thinning solvents and silane coupling agents can be also used. In this case, the material of the mesh 47 and the mesh band 52 is desirably changed according to wetting ability of the chemical with respect thereto. For example, metals other than stainless steel or resins can be used as materials for them. The liquid control apparatus 30 can be used not only with the liquid vaporizer 10, but also with other devices such as liquid coating devices and film forming devices.

What is claimed is:

1. A liquid control apparatus configured to control a spread of a liquid, comprising:
    a main body having a supply surface to which the liquid is supplied;
    a mesh body woven in a net-like shape and provided over the supply surface to be in contact with the supply surface;
    a first groove formed on the supply surface; and
    an introducing port formed on the supply surface, configured to introduce a gas from an inside of the main body to the first groove,
    wherein the first groove and the introducing port are covered with the mesh body.

2. The liquid control apparatus according to claim 1, wherein the introducing port is formed such that the gas is introduced into the first groove substantially parallel to the supply surface.

3. The liquid control apparatus according to claim 1, further comprising:
    a supply port formed on the supply surface, configured to supply the liquid from the inside of the main body to the supply surface; and
    a discharge port formed in the main body, configured to discharge a fluid from a space on the periphery of the supply surface into the inside of the main body, wherein the supply port is formed between the first groove and the discharge port.

4. The liquid control apparatus according to claim 3, further comprising:
    a second groove formed on the supply surface, the second groove being connected to the discharge port.

5. The liquid control apparatus according to claim 4, wherein the second groove extends in a direction substantially perpendicular to a first direction from the supply port to the discharge port on the supply surface.

6. The liquid control apparatus according to claim 5, wherein the second groove includes an extension section extending in a direction opposite to the first direction and then extending to an outer edge of the supply surface in a second direction substantially perpendicular to the first direction.

7. The liquid control apparatus according to claim 1, wherein the main body is disposed so that the supply surface is on an upper side.

8. The liquid control apparatus according to claim 7, further comprising:
    a discharge port formed in the main body, configured to discharge a fluid from a space on the periphery of the supply surface into the inside of the main body;
    a discharge passage connected to the discharge port and configured to discharge the fluid; and
    a branch passage branching off from a lower section of the discharge passage.

9. The liquid control apparatus according to claim 1, further comprising:
    a supply port formed on the supply surface, configured to supply the liquid from the inside of the main body to the supply surface; and
    a heater provided inside the main body, configured to heat the supply surface,
    wherein the supply port is formed between the first groove and the heater in a spread direction of the liquid.

10. The liquid control apparatus according to claim 1, further comprising:
    a supply port formed on the supply surface, configured to supply the liquid from the inside of the main body to the supply surface;
    a temperature sensor provided inside the main body, configured to detect a temperature of the supply surface,
    wherein the supply port is formed between the first groove and the sensor in a spread direction of the liquid.

11. The liquid control apparatus according to claim 1, further comprising a guide member in contact with the mesh body from a side opposite the supply surface of the main body.

12. The liquid control apparatus according to claim 11, wherein the introducing port is formed in the first groove where the first groove and the guide member overlap each other.

13. The liquid control apparatus according to claim 2, further comprising:
    a supply port formed on the supply surface, configured to supply the liquid from the inside of the main body to the supply surface; and
    a discharge port formed in the main body, configured to discharge a fluid from a space on the periphery of the supply surface into the inside of the main body,
    wherein the supply port is formed between the first groove and the discharge port.

14. The liquid control apparatus according to claim 2, wherein the main body is disposed so that the supply surface is on an upper side.

15. The liquid control apparatus according to claim 4, wherein the main body is disposed so that the supply surface is on an upper side.

16. The liquid control apparatus according to claim 2, further comprising:
    a supply port formed on the supply surface, configured to supply the liquid from the inside of the main body to the supply surface; and
    a heater provided inside the main body, configured to heat the supply surface,
    wherein the supply port is formed between the first groove and the heater in a spread direction of the liquid.

17. The liquid control apparatus according to claim 3, further comprising:
    a supply port formed on the supply surface, configured to supply the liquid from the inside of the main body to the supply surface; and
    a heater provided inside the main body, configured to heat the supply surface,
    wherein the supply port is formed between the first groove and the heater in a spread direction of the liquid.

18. The liquid control apparatus according to claim 2, further comprising:
- a supply port formed on the supply surface, configured to supply the liquid from the inside of the main body to the supply surface;
- a temperature sensor provided inside the main body, configured to detect a temperature of the supply surface,
- wherein the supply port is formed between the first groove and the sensor in a spread direction of the liquid.

19. The liquid control apparatus according to claim 3, further comprising:
- a supply port formed on the supply surface, configured to supply the liquid from the inside of the main body to the supply surface;
- a temperature sensor provided inside the main body, configured to detect a temperature of the supply surface,
- wherein the supply port is formed between the first groove and the sensor in a spread direction of the liquid.

20. The liquid control apparatus according to claim 2, further comprising a guide member in contact with the mesh body from a side opposite the supply surface of the main body.

21. The liquid control apparatus according to claim 1, wherein the first groove is formed in a substantially semicircular arc-shape or U-shape having two arms extending from a middle portion where the introducing port is formed.

22. The liquid control apparatus according to claim 21, wherein the first groove includes linear sections provided at an end of each of the two arms, the linear section extending toward respective edges of the supply surface.

23. The liquid control apparatus according to claim 3, wherein the first groove is formed in a substantially semicircular arc-shape or U-shape having two arms extending from a middle portion where the introducing port is formed, and wherein the supply port is formed between the two arms.

* * * * *